United States Patent [19]
Kimura

[11] Patent Number: 5,767,861
[45] Date of Patent: Jun. 16, 1998

[54] PROCESSING APPARATUS AND METHOD FOR DISPLAYING A MOVING FIGURE CONSTRAINED TO PROVIDE APPEARANCE OF FLUID MOTION

[75] Inventor: Shin Kimura, Tokyo, Japan

[73] Assignee: Kabushiki Kaisha Sega Enterprises, Tokyo, Japan

[21] Appl. No.: 513,517

[22] Filed: Aug. 10, 1995

[30] Foreign Application Priority Data

Aug. 11, 1994 [JP] Japan .................................. 6-189351
Dec. 2, 1994 [JP] Japan .................................. 6-299882

[51] Int. Cl.$^6$ .................................................. G06T 13/00
[52] U.S. Cl. ........................ 345/473; 345/474; 345/427
[58] Field of Search ............................ 395/119, 120, 395/127, 137, 138, 173, 174, 86, 92

[56] References Cited

U.S. PATENT DOCUMENTS

| | | | |
|---|---|---|---|
| 5,267,154 | 11/1993 | Takeuchi et al. | 395/173 |
| 5,483,630 | 1/1996 | Unuma et al. | 395/175 |
| 5,506,949 | 4/1996 | Perrin | 395/173 |
| 5,581,665 | 12/1996 | Sugiura et al. | 395/86 |

OTHER PUBLICATIONS

Foley et al, *Computer Graphics Principles and Practice*, second edition, Addison-Wesley Publishing Company, 1993, pp. 217–226.

*Primary Examiner*—Heather R. Herndon
*Assistant Examiner*—Stephen Hong
*Attorney, Agent, or Firm*—Finnegan, Henderson, Farabow, Garrett & Dunner, L.L.P.

[57] ABSTRACT

An image processor for displaying a predetermined moving figure includes a reference point memory for storing data on a plurality of reference points; each reference point is for displaying the figure in according to a series of movements of the figure. The image processor also includes, a control point memory for storing data for a plurality of control point. Each control point is for determining another position of the figure relative to each reference point. The image processor also includes, an operation unit for outputting a movement command to the figure and an image display unit for performing an image process to display the figure in an area of a coordinate system determined by the reference point and the control point in accordance with the movement command. When the control point is changed to another position, the position and disposition of the figure in the predetermined coordinate system are immediately calculated.

16 Claims, 19 Drawing Sheets

FIG.4
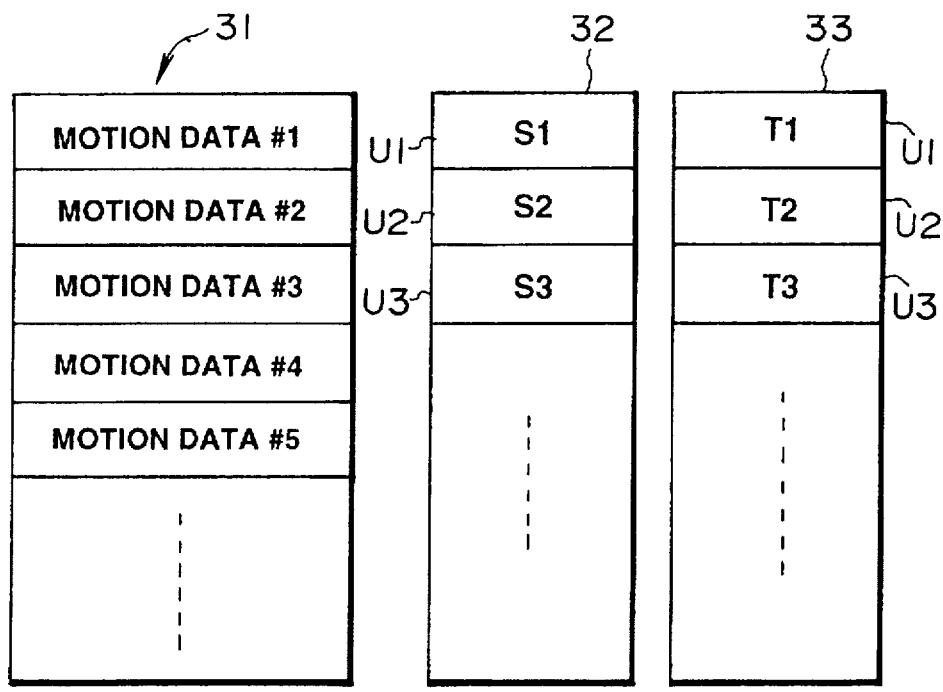
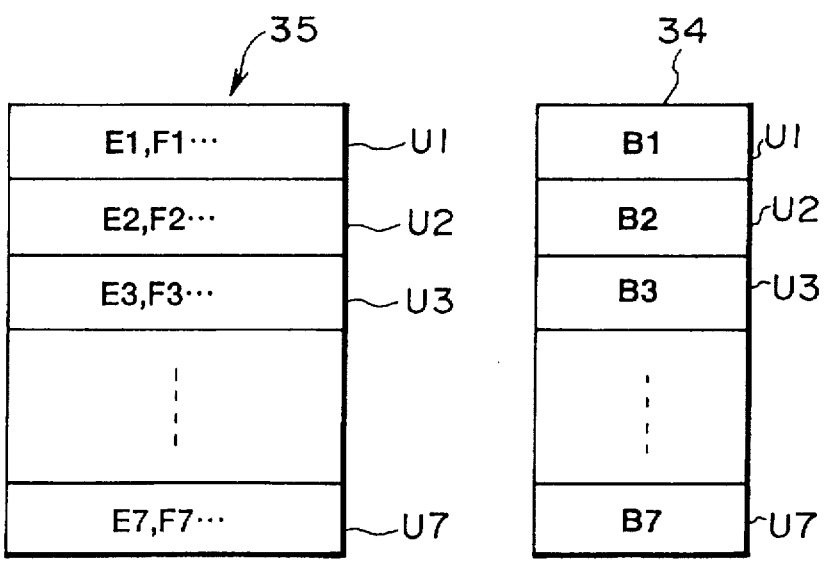

5,767,861

PROCESSING APPARATUS AND METHOD FOR DISPLAYING A MOVING FIGURE CONSTRAINED TO PROVIDE APPEARANCE OF FLUID MOTION

BACKGROUND OF THE INVENTION

The present invention relates to image processing devices and methods, and more particularly to an image processing device and method which improve techniques for moving and displaying figures, which include characters and the parts which comprise each of the characters, used generally in game devices.

Generally, an image processing device (or image processor) of this type moves and displays a figure displayed on a display scene in accordance with an operation command. It includes a memory which stores data on the coordinates of the position of the moving figure and other required data and processing programs and an operation unit which outputs an operation command to determine and operate the moving state of the character, and a data processor which performs a display process in which a predetermined figure is moved while being displayed on the display screen on the basis of the operation command in accordance with the various data and processing programs in the memory and which outputs an image including the results of the processing as a display signal.

When a power supply for such image processor is turned on and the required operations are performed on the image processor, the data processor operates in accordance with the programs in the memory and performs the following operations.

When an operation command is given from the operation unit to the data processor, the data processor fetches required data on the movement of the character from among data on various moving states (motions) of the character in the memory on the basis of the operation command, synthesizes a character with the fetched data and moves the character sequentially on the display screen.

The image processor forms a display signal indicative of an image which includes the result of the processing in accordance with the programs, and delivers the display signal to the display. Thus, the character is moved on the predetermined background on the display screen. The respective parts are defined in a body coordinate system. They are model-transformed to data in a world coordinate system, and visual field-transformed to images to be displayed.

In order to move the character on the display screen of a conventional image processor, a plurality of factors required for modeling transformation for all the phases of the respective motions of the parts of the character is prepared and stored in the form of a table in the memory. Data on the respective motions of the parts is fetched from the table in accordance with an operation command from the operation unit. The parts are moved on the basis of the data on the display screen such that the character is moved sequentially while being displayed on the display.

In order to move the characters on the display screen of the conventional image processor, however, a large amount of data on the movements of the respective parts is required which thereby disadvantageously increases the required amount of memory. Thus, much labor and time is necessarily required for the creation of such a table.

Thus, in the conventional image processor, the quantity of data on the movements of the characters and hence their kinds of movements are necessarily limited, so that fine movements of the character cannot be achieved as the case may be. Thus achieving, the movement of parts of a character that is similar to motion of a human being such as, for example, the motion of joints whose various free movements cannot be expressed sufficiently using conventional image processors. As just described above, since a large amount of labor and time is required for the creation of such table, the movements of the characters cannot easily be changed or adjusted.

Since a large amount of data on the movements of the respective characters is prepared and stored, the processing time required for display of the characters increases and display of the characters is disadvantageously delayed.

It is therefore an object of the present invention to provide an image processor which is capable of expressing the movement of the characters variously without increasing a quantity of data required for displaying the movement of the characters.

It is another object of the present invention to provide an image processor which is capable of reducing the processing time required for displaying the characters and displaying the resulting image rapidly.

It is a further object of the present invention to provide an image processing method which is capable of expressing the movement of the characters variously without increasing the quantity of data required for displaying the movement of the characters.

It is a still further object of the present invention to provide an image processing method which is capable of reducing the processing time required for displaying the characters and displaying the resulting image rapidly.

SUMMARY OF THE INVENTION

In order to achieve the above objectives, the present invention provides an image processor for displaying a predetermined figure while moving same, comprising a reference point memory for storing data on a plurality of reference points, one for each reference for displaying the figure in correspondence to a series of movements of the figure, a control point memory for storing data on a plurality of control points, one for determining another position of the figure relative to each reference point;

an operation unit for outputting a movement command to the figure;

an image display unit for performing an image process to arrange the figure in an area of a coordinate system determined by the reference point and the control point in accordance with the movement command.

The image processor may further comprise an angle calculation unit for calculating an angle of the figure to a predetermined coordinate system on the basis of data on the coordinates of the reference and control points of the figure read from the reference and control point memories in correspondence with the series of movements of the figure determined on the basis of the movement command, and an arranging unit for arranging the figure at the calculated angle to the predetermined coordinate system.

The angle calculation unit may calculate the angle of the figure involving the control and reference points to the coordinate system of the reference point The arranging unit may arrange the figure from the reference point at the calculated angle to the coordinate system of the reference point.

The image processor may comprise a memory for storing data on the figure beforehand in a predetermined coordinate system. The image display unit may arrange a figure formed on the basis of data on the figure in the area of the coordinate system.

The angle calculation unit may multiply absolute coordinates of the control point by an inverse matrix for a matrix of the reference point to obtain relative coordinates of the control point to the reference point, and calculate the angle on the basis of the relative coordinates.

The figure may be comprised of a plurality of connected parts with the reference point being provided in a part including a first end of the figure and with the control point being provided in a part including a second end of the figure. The image display unit may comprise a joint calculation unit for calculating a joint where adjacent parts are connected. The angle calculation unit may calculate a joint angle at which the adjacent part is connected to the joint. The arranging unit may arrange the part having the reference point at the last-mentioned calculated angle from the first end of the figure and also arranges another part according to the joint angle relative to the part adjacent to the joint.

The reference point may be set in the base end of the figure and the control point is set in another end of the figure from its base end.

The image display unit may comprise a unit for changing and/or setting the control point to and/or at a desired position.

The angle calculation unit may calculate the angle on the basis of a bone having a length defined for the figure.

The image display unit may comprise a matrix calculation unit for calculating a matrix of the figure for a predetermined coordinate system on the basis of data on the coordinates of the reference and control points of the figure read from the reference and control point memories in correspondence to the series of movements of the figure determined on the basis of the movement command, and a unit for arranging the figure to the calculated matrix.

The matrix calculation unit may calculate a matrix of the control point to the coordinate system of the reference point. The arranging unit may arrange the figure on the basis of the calculated matrix.

The matrix calculation unit may calculate the relative coordinates of the control point to the reference point, using a transposed matrix for the matrix of the reference point, and calculates the matrix on the basis of the relative coordinates.

The figure may include a character comprised of a plurality of connected parts with the reference point being provided in a part including a first end of the figure and with the control point being provided in a part including a second end of the figure. The matrix calculation unit may perform a matrix operation on the matrix of the control point to obtain a matrix of a part at a joint where the last-mentioned part is connected to another part, and also performs a matrix operation on a matrix of the last mentioned joint to obtain a matrix of the another part at the joint. The arranging unit may arrange the character in a predetermined coordinate system on the basis of the matrixes of the respective parts.

An image processing method for displaying a predetermined figure while moving same may comprise the steps of:
setting data on a plurality of reference points, one as each reference for displaying the character in correspondence to a series of movements of the figure,
setting a control point which determines another position of the figure relative to the reference point;
outputting a movement command to the figure; and
displaying the figure in an area of a coordinate system determined by the reference point and the control point in accordance with the movement command.

According to the image processor and image processing method of the present invention, data on the reference point for display of a figure is read from the reference point memory in accordance with a movement command. Data on the control point which determines another position of the figure relative to the reference point is read from the control point memory. Image display processing is performed to display the figure in an area in a coordinate system determined by the reference and control points.

Thus, since display of the movement of the figure is achieved substantially by determining the reference and control points, a quantity of data required for display of the movement of the figure is reduced compared to the conventional case and the control point is changed to and set at a desired position to realize various free movements of the figure.

According to the invention, in correspondence to a series of movements of the figure determined on the basis of a movement command, an angle of the figure to a predetermined coordinate system is calculated on the basis of data on the coordinates of the reference and control points of the figure read from the reference and control point memories. The figure is arranged at the calculated angle, so that even when no data on angles is stored beforehand, the angle of the figure is calculated and the figure is displayed at that angle each time the figure moves.

By calculating the angle as such to the coordinate system of the reference point, the figure can be arranged accurately at its reference point.

By storing data on the figure beforehand in a predetermined coordinate system and arranging a figure formed by data on the figure in an area of the coordinate system, previous creation and storage of data on the coordinates of the respective moving dots which constitute the figure is omitted. The data on the coordinates of the respective moving dots includes spline data used to define a two-dimensional figure and polygon data used to define a three-dimensional figure.

By multiplying the absolute coordinates of the control point by an inverse matrix for the matrix of the reference point, the relative coordinates of the control point to the reference point are calculated. By calculating the angles of the figure on the basis of the reference coordinates, the angles of the figure containing the control and reference points to the coordinate system of the reference point are obtained easily and rapidly. By setting the reference point in the base end of the figure and the control point in another end of the character, a movement of the figure similar to that of a human body is realized.

When (1) the figure is comprised of a plurality of connected parts, (2) the reference point is provided in a part including the base end of the figure, and (3) the control point is provided in a part including another end of the figure, a joint of adjacent parts is calculated, a joint angle at which the adjacent parts are connected, an angle at which the figure containing the joint is arranged to a reference coordinate system of the reference point is calculated, the part including the base end of the figure is arranged at the last-mentioned angle from the reference point, and the other of the adjacent connected parts is arranged at the joint angle from the joint to thereby in such a case, the moving state of the figure is displayed only by setting the reference and control points.

The image display unit comprises a matrix calculation unit for calculating a matrix of the figure for a predetermined coordinate system on the basis of data on the coordinates of the reference and control points of the figure read from said reference and control point memories in correspondence to the series of movements of the figure character determined on the basis of the movement command, and a unit for arranging the character in the calculated matrix for the predetermined coordinate system.

The matrix calculation unit calculates relative coordinates of the control point to the reference point, using the fact that a first matrix obtained by rotation of a second matrix around a coordinate axis is a transposed matrix for a third matrix obtained by rotation of the second matrix around a second coordinate axis, calculates the values of cosine and sine used to perform a matrix operation on the calculated relative coordinates, and performs a matrix operation on the basis of the values of cosine and sine to thereby calculate the matrix of the control point for the coordinate system of the reference point. The arranging unit arranges the figure in accordance with the last-mentioned matrix.

Even when (1) the figure is comprised of a plurality of connected parts (bones), (2) the reference point is provided in a part including the base end of the figure, and (3) the control point is provided in a part including another end of the figure, the matrix calculation unit performs a matrix operation on the matrix of the control point to calculate a matrix of a part at its joint as mentioned above and performs a matrix operation on the matrix of the joint to obtain a matrix of the other of the connected parts. As just described above, the matrixes of the figure are directly calculated for the respective joints.

BRIEF DESCRIPTION OF THE DRAWINGS

FIG. 4 illustrates the structure of a storage used in the present embodiment;

DESCRIPTION OF THE PREFERRED EMBODIMENTS

<First Embodiment>

[Structure of Image Processor]

Figure 1:
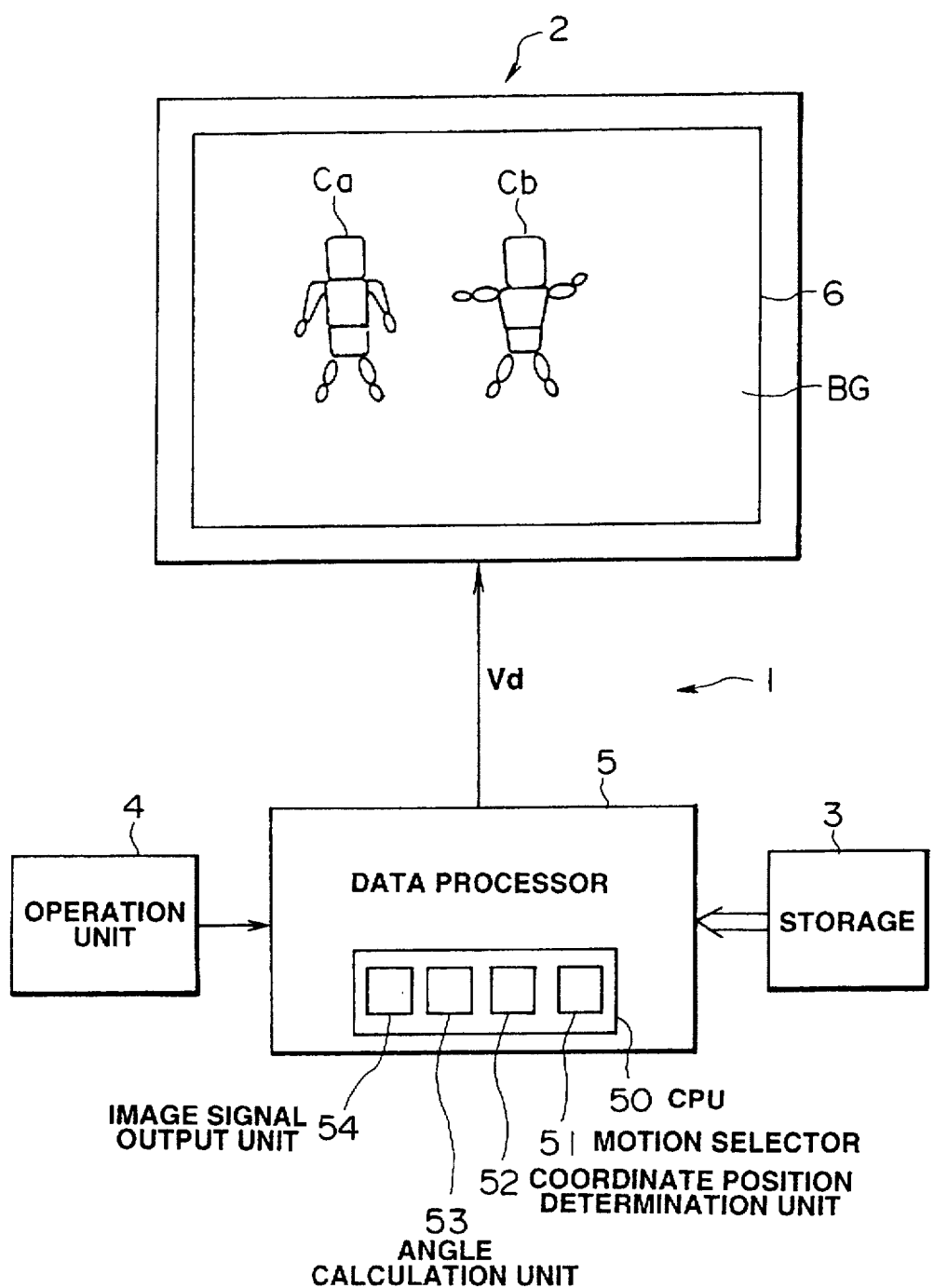
FIG. 1 is a block diagram indicative of a first embodiment of an image processing device (or image processor) according to the present invention.

FIG. 1 illustrates an embodiment of an image processor according to the present invention.

In FIG. 1, the image processor 1 mainly includes a display 2 for display of characters Ca, Cb, etc.; a storage 3 which stores various data, tables and programs; an operation unit 4 which gives an operation signal to command the movement of the characters Ca, Cb displayed on the display 2; and a data processor 5 which creates display data by referring to various data in the storage 3 on the basis of the operation command from the operation unit 4 and delivers the display data to the display 2. Those respective elements are constructed as follows:

The display 2 is connected to the data processor 5, which displays the characters Ca, Cb and other images (for example, a background image (BG)) as a single display screen 6 in accordance with a display signal delivered from the data processor 5. The storage 3 has three-dimensional coordinate data representing the characters and the data processor 5 creates an image viewed from a predetermined visual point.

[Structure of the Character]

Figure 2:
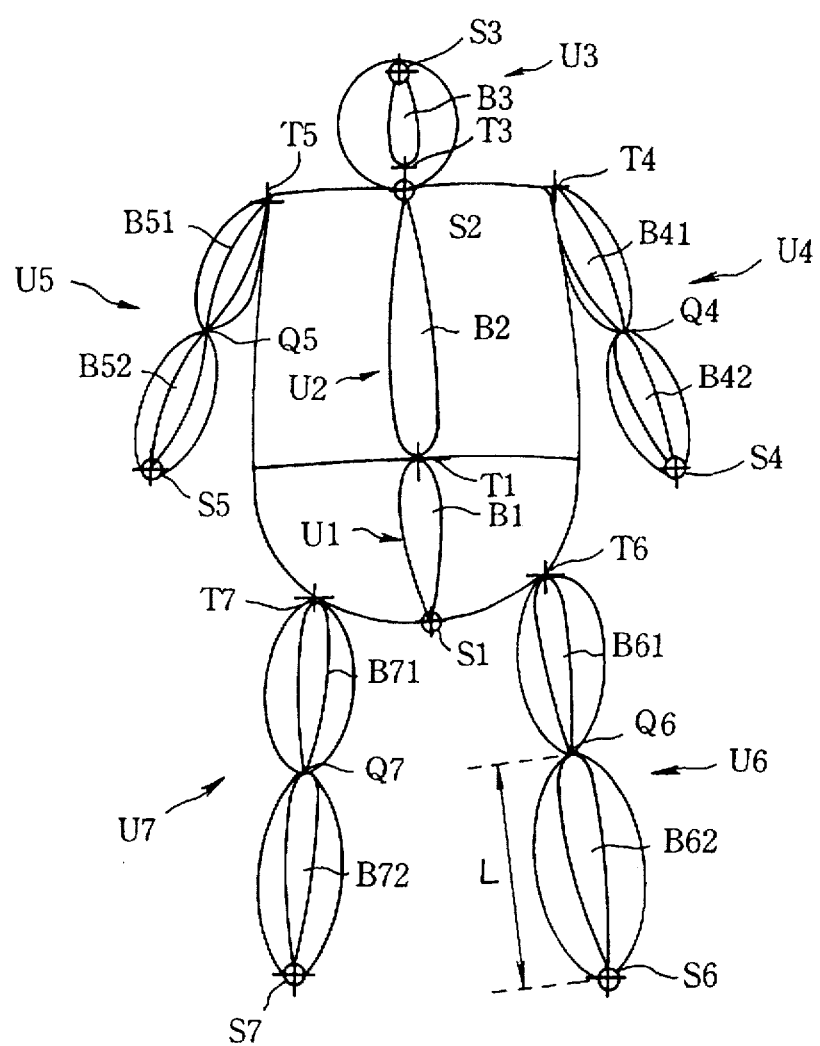
FIG. 2 illustrates a displayed character used in the present embodiment.

FIG. 2 illustrates the structure of the character Ca or Cb. Those characters are designated generally as "C" below.

The character C is intended to express a human body or a three-dimensional fighter, and is comprised, for example, of a waist part U1, a breast part U2, a head part U3, a left arm part U4, a right arm part U5, a left leg part U6, and a right leg part U7, which are expressed generally by "U". The image processor creates a figure in the form of a three-dimension figure.

In the embodiment, each part U has its own shape which contains one or two connected bones connected between a reference point T and a control point S. The parts U each comprised of a single bone are a head, breast, and waist while the parts U comprised of two connected bones are right and left arms, and right and left legs. Since in this specification a human body is assumed as the character, the expression "bone" is employed as a term of convenience.

The parts and their arrangement are defined by the coordinates of the reference point T, control point S, a bone arranged between the points T and S (if there are two connected bones, the angle enclosed between the two bones).

In the present embodiment, the angles of each part in a predetermined coordinate system in relation to its axes are calculated on the basis of data on the control and reference points S and T and a bone B are arranged between the points T and S in accordance with data on the angles in the coordinate system The reference point T is used as a reference when each part is defined, and is set in the base end of that part. The control point S is used to determine the position of another end of that part from the reference point T and is set in the another end of that part.

The respective reference points are comprised of relative coordinates of a part depending on a locus of a series of movements of that part The respective control points are comprised, for example, of predetermined positions which the opposite end of that part occupies in the course of the series of movements of that part in relation to, or irrespective of, the series of movements of that part. In the present embodiment, data on the control point is comprised of data on absolute coordinates in an absolute coordinate system of the display 2.

Data for a reference point includes data for the relative coordinates and data for an angle of the coordinate system for the reference point to the absolute coordinate system.

The reference points of the parts U2–U7 other than the waist part U1 are defined by the respective coordinates relative to the reference point T1 of the waist part U1. That is, the reference point T1 of the waist part U1 is a reference for the other parts and is specified by the absolute coordinates in the absolute coordinate system and the angle of the coordinate system for the reference point T1 relative to the absolute coordinate system.

A bone(s) B corresponding to each part has a different length L, data on which is recorded in the X-axis direction (in which the character advances) of another predetermined coordinate system. Thus, for example, by calculating the angles of one bone B to the respective Y and Z axes of the XYZ-orthogonal coordinate system for the reference and control points T and S and transforming data on the bone B recorded in the predetermined coordinate system to that in the coordinate system for the reference point T in accordance with those angles, the part U is defined between the reference and control points T and S.

Thus, for the character C, for example, the waist part U1 has its own shape which contains one bone B1 arranged between the reference and control points T1 and S1; the breast part U2 has its own shape which contains one bone B2 arranged between reference and control points T1 and S2; the head part U3 has its own shape which contains one bone B3 arranged between reference and control points T3 and S3; the left arm part U4 has its own two-portion shape which contains two bones B41 and B42 connected through a joint Q4 and arranged between reference and control points T4 and S4; the right arm part U5 has its own two-portion shape which contains two bones B51 and B52 connected through a joint Q5 and arranged between points T5 and S5: the left leg part U6 has its own two-portion shape which contains two bones B61 and B62 connected through a joint Q6 arranged between reference and control points T6 and S6; and the right leg part U7 has its own two-portion shape which contains two bones B71 and B72 connected through a joint Q7 and arranged between reference and control points T7 and S7.

In the character C, one of the parts U1–U7 is selected as a basic part and other parts are handled as auxiliary parts.

Figure 3:
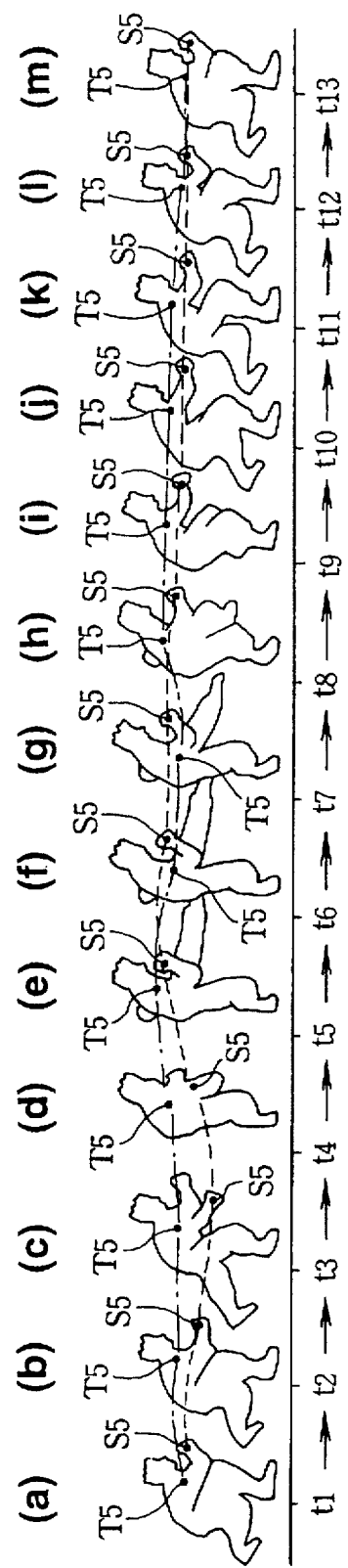
FIG. 3 illustrates the movements or motions of the displayed characters realized by the embodiment.

Preferably, the basic part is a central part, for example, the waist part U1, of the parts of the character which performs sequential movements at corresponding equally spaced times t1–t13, as shown in FIG. 3. Alternatively, the waist part U2 may be employed as the basic part. In the present embodiment, the waist part U1 is employed as the basic part for convenience of explanation.

By giving the coordinates of the reference point T or the control point S at the respective successive times t1, t2, . . . in the movements of the respective parts with a spline function, the need for giving the quantity of data on other possible points between any adjacent times ti and ti+1 is eliminated and a smoothly continuous motion of the character is obtained.

For example, the control and reference points S5 and T5 of the right arm part U5 are typically indicated in FIG. 3. By calculating the loci of the reference and control points with corresponding spline functions, smooth movements of the reference and control points of the right arm part U5 are expressed, as shown by a broken line and a dotted-dashed line, respectively. Alternatively, data on the loci of movements of the reference and control points may be stored beforehand.

The spline function expresses a smooth curve extending between two adjacent points called nodes. A curve between any adjacent nodes is expressed by the following set of polynomials (1)–(3). In addition, a different set of polynomials may be used between different two adjacent nodes:

(1) . . . $x = a0 + a1t + a2t^2 + \ldots + antn$, (2) . . . $y = b0 + b1t + b2t^2 + \ldots + bntn$, (3) . . . $z = c0 + c1t + c2t^2 + \ldots + cntn$, where a0, a1, a2, . . . , and an: are constants;

b0, b1, b2, . . . , and bn: are constants;

c0, c1, c2, . . . , and cn: are constants;

x: is a coordinate on the x-axis;

y: is a coordinate on the y-axis;

z: is a coordinate on the z-axis; and t: a parameter fluctuating in a range of $0 \leq t \leq 1$ between adjacent joints.

As just described above, the spline function is a set of sectional polynomial functions and is easy to differentiate and integrate, so that creation of a required smooth curve is facilitated in computer graphic techniques. That is, by defining curves between the adjacent reference points as nodes and between the adjacent control points as nodes with the corresponding spline functions, a smooth movement is imparted to the characters.

By arranging the reference point T1 of the waist part U1 of a character C at a position in the three-dimensional absolute coordinate system, and arranging the respective reference points T2–T7 of the parts U2–U7 relative to the reference point T as a reference, the respective parts are connected through the respective adjacent parts to the waist part U1 and as a result, the character is displayed as having a changeable shape as a whole.

[Storage 3]

FIG. 4 shows predetermined storage areas in the storage 3 and includes a motion data memory 31 which stores data on a series of movements of the reference point T1 of the waist part U1, a memory 32 which stores data on the control points of the respective parts U1–U7, a reference point memory 33 which stores data on the reference points of the auxiliary parts U1–U7, a bone data memory 34 which stores data on the bones, and an auxiliary memory 35 which stores data required for the defined bones to finally define the whole character.

The motion data memory 31 stores a plurality of motion data #1, #2, .... corresponding to a like number of different motions (jumping, running, etc.) of the character C. The motion data memory 31 stores data on a plurality of different three-dimensional absolute coordinates of the moving reference point of the waist part U1 as the basic part, one coordinate for the phase of each of a series of waist part's movements in each of its plurality of motions, and/or data on the angle of the coordinate system for the reference point to the absolute coordinate system. The absolute coordinate system implies a world coordinate system. FIG. 3 shows one example of the motions.

If, for example, approximately 500–700 motion data #1, #2, .... are prepared for one character C, substantially all the motions of the character (for example, a fighter) which are imagined usually are covered.

The control point memory 32 contains data on the absolute coordinates of the control points S of the waist part U1 and the other auxiliary parts U2–U7.

The reference point memory 33 contains data on the relative coordinates of the reference points T of the other auxiliary parts U2–U7 to the reference point of the waist part U1 and/or data on the angle of the reference coordinate system for the respective reference points to the absolute coordinate system. The relative coordinates are given as three-dimensional coordinates relative to the reference point of the waist part U1.

The bone data memory 34 stores data on the respective lengths L of the bones B1, B2, B3, (B41, B42), (B51, B52), (B61, B62) and, (B71, and B72) (FIG. 2) of the respective part parts U1, U2, U3, . . . , U7, and other required data. The data on those bones is recorded in the X-axis direction (in which the character moves) of the predetermined XYZ coordinate system, as mentioned above.

In this embodiment, by defining the respective shapes of flesh for the bones, a three-dimensional shape of the character (fighter) is defined. For example, when a figure of an upper arm is defined in a body coordinate system and is subjected to modeling transformation to produce a figure in the world coordinate system, a plurality of polygons which forms the shape of the upper arm is arranged, for example, relative to the center of gravity of the upper arm bone (B41 or B51). Thereafter, the fighter is visual-field transformed and the resulting character is displayed. In the present embodiment, a bone is used to arrange (or define) a part based on its reference and control points in the world coordinate system. The bone is normally not arranged in the world coordinate system. The auxiliary memory 35 contains data on the coordinates of the respective polygons which form each of three-dimensional shapes of the respective part parts. The auxiliary memory 35 further contains data E1, E2, E3, . . . , on colors, data F1, F2, F3, . . . on the qualities (skin texture, metal surfaces, etc.) and data on other display characteristics of the displayed fighter.

As shown in FIG. 1, the storage 3 which includes the motion data memory 31, control point memory 32, reference point memory 33, bone data memory 34 and auxiliary memory 35 is connected to the data processor 5. The storage 3 stores various data on the three-dimensional display of the character C, other required data (for example, on the background image) and processing programs.

The data processor 5 executes required image processing operations in accordance with those programs.

The operation unit 4 is connected to the data processor 5 and generates an operation command to operate the character Ca or Cb (as the fighter) and gives it to the data processor 5. The operation command is mainly comprised of an output to move the fighter.

The data processor 5 performs a process to move the character C on the display 2 on the basis of an operation command from the operation unit 4 in accordance with various data and processing programs stored in the storage 3 (motion data memory 31, control point memory 32, reference point memory 33, bone data memory 34 and auxiliary memory 35), and outputs an image which contains the result of the processing as a display signal Vd to the display 2.

The data processor 5 includes a CPU 50 which performs various operations in accordance with various motion data and programs in the storage 3 and which realizes a motion selector 51, a coordinate position determination unit 52, an angle calculation unit 53, and an image output control unit 54.

[Functional Blocks of the Image Processor]

Figure 5:
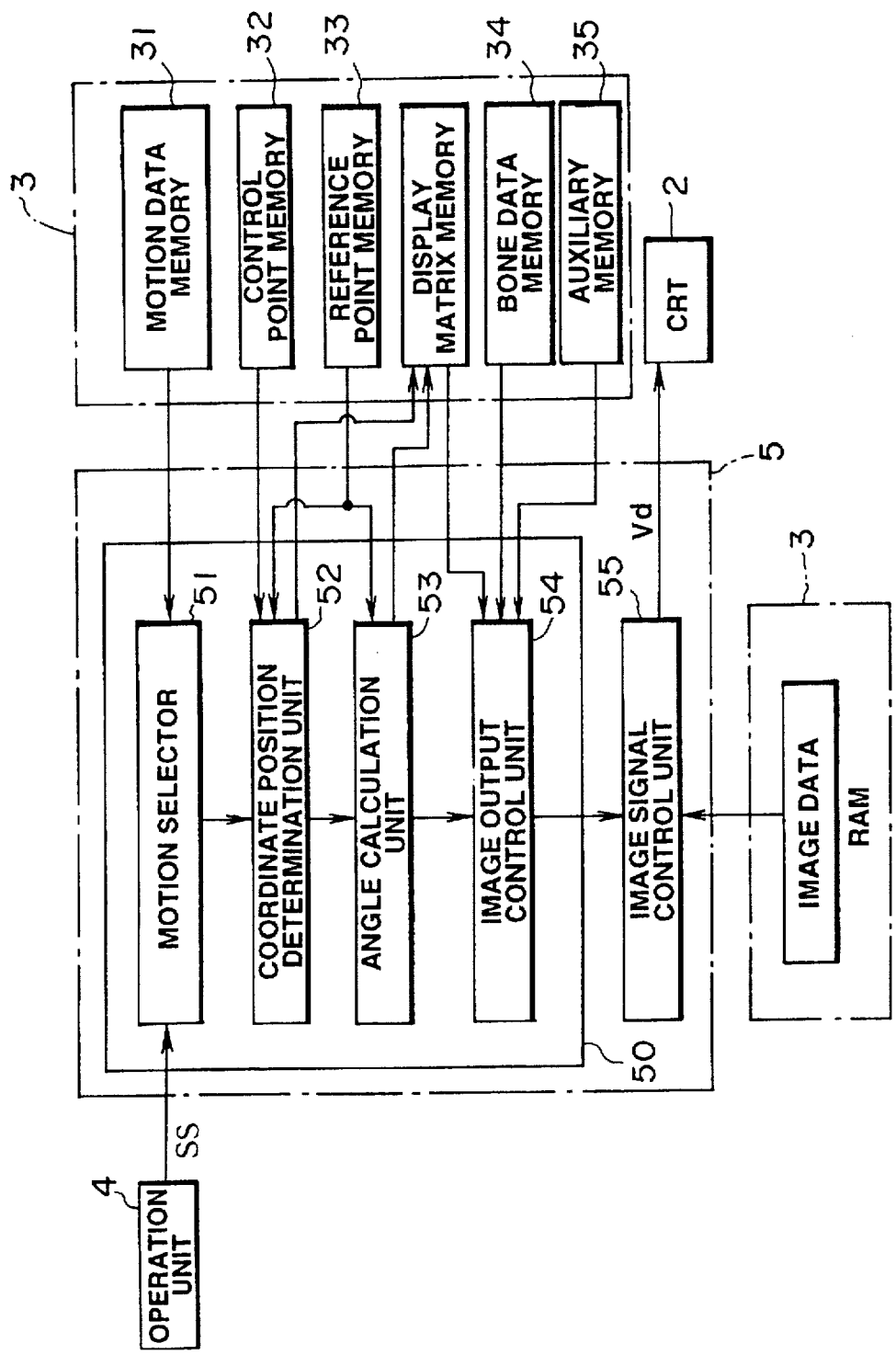
FIG. 5 is a functional block diagram of the embodiment.

FIG. 5 is directed to the functional block diagram of the image processor 1 the respective elements of the data processor will be detailed below.

In FIG. 5, the CPU 50 executes a predetermined operation program in the storage 3 to realize the motion selector 51 which reads an operation command SS from the operation unit 4, selects a desired motion of a plurality of motions of the character C from the motion data memory 31 of the storage 3 on the basis of the operation command SS from the operation unit 4, more specifically, data (on the coordinates, etc.) on the reference point of the part U1 in the selected motion. The coordinate position determination unit 52 reads data on the respective positions of the reference points of the parts U2–U7 at predetermined moments (any of the moments (a)–(m) of FIG. 3) in the selected motion in the form of relative coordinates from the reference point memory 33, similarly, data on the positions of the control points of the parts U1–U7 corresponding to that motion and those moments from the control point memory 33, and determines on the basis of this data the coordinate positions in the coordinate system on the display on which the respective parts are moved and displayed. The coordinates of the reference points of the pars U1–U7 are transformed to those in the form of absolute coordinates, data on which transformed coordinates is stored along with data on the coordinates of the control points in the display matrix memory 36.

The angle calculation unit 53 calculates the angle of a bone B of each part to the coordinate system for the reference point on the basis of the data on the coordinates of the reference and control points concerned. The angle calculation unit 53 sequentially calculates the angles of the bones which change depending on the respective phases of a particular motion. Each time such angle is calculated, data on the angle is stored in the display matrix storage 36.

Figure 7:
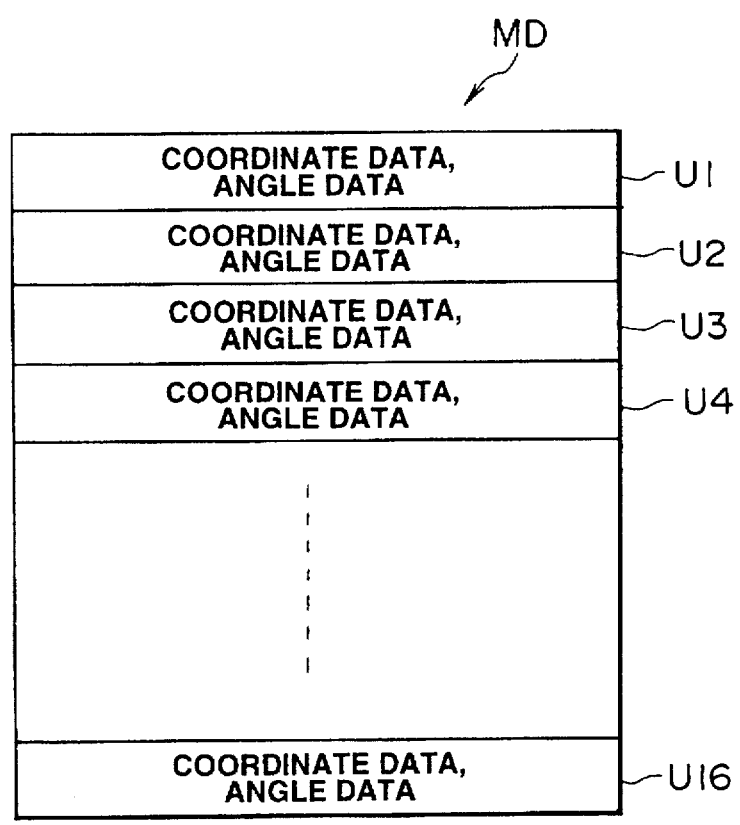
FIG. 7 illustrates the structure of a display matrix memory used in the present embodiment.
Figure 8:
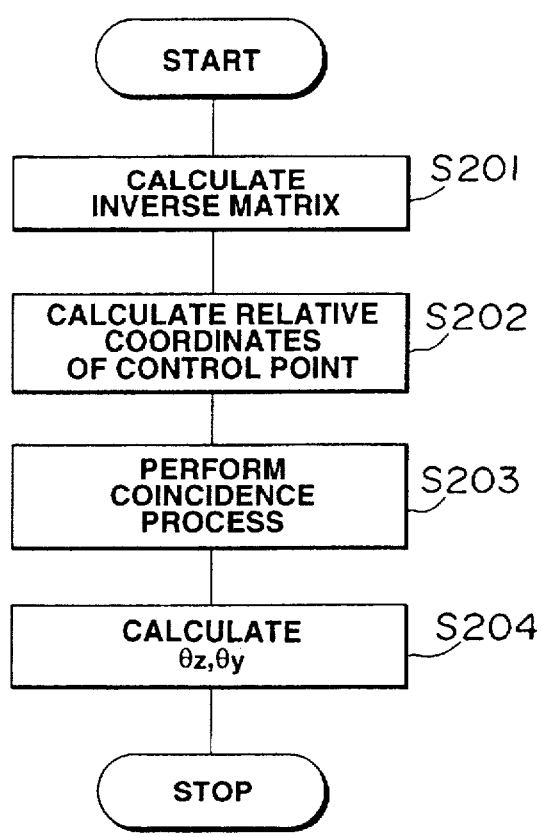
FIG. 8 is a flow chart indicative of calculation of an angle of a part.

The display matrix memory 36 is formed in a RAM of the storage 3, and stores data on the coordinates of the respective reference points of the parts and data on their (bone) angles at their reference points in the respective phases of each motion, as shown in FIG. 7.

The image output control unit 54 of FIG. 5 performs a movement and display process for each of the parts of a character and hence for the character on the basis of data on the coordinates obtained in the coordinate position determination unit 52 and data on the angles obtained by the angle calculation unit 53. The image output control unit performs the operation of sequentially displaying the contents of the display matrix memory 36 onto the CRT 2. It fetches data on the bones of the appropriate part from the memory 34 and arranges the appropriate parts at the calculated angles to the coordinate axes of its coordinate system with the base end of the bone as the reference point.

The data processor 5 further includes the image signal control unit 55, which forms a display signal Vd on the basis of data on the character fetched from the image output control unit 54 of the CPU 50, data on the image signal from the CPU 50 and image data stored in a ROM of the storage 3 and delivers it to the display 2.

The operation of the image processor, thus constructed, will be described next.

<Creation of the Character>

Figure 6:
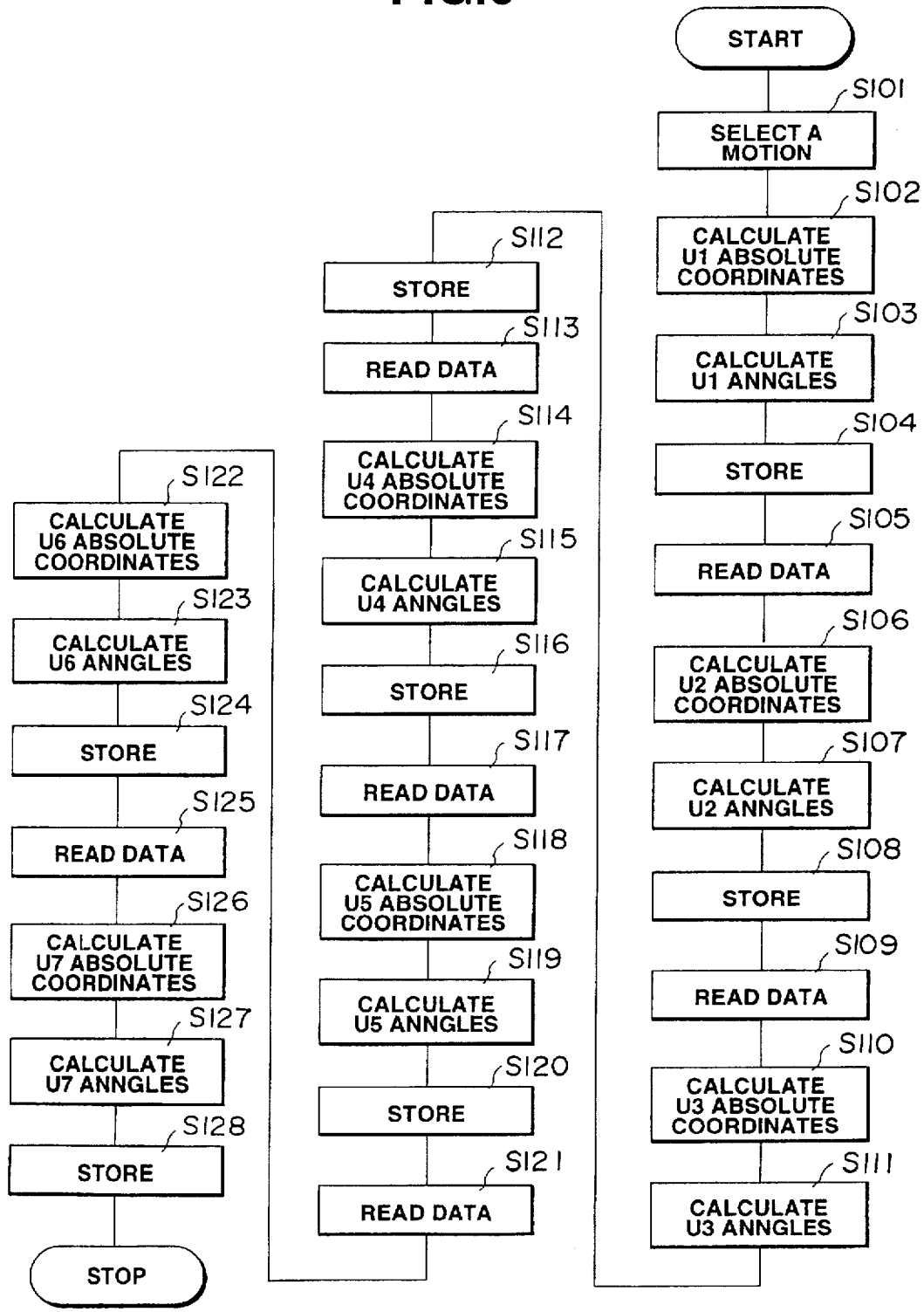
FIG. 6 is a flow chart indicative of the operation of the present embodiment.

FIG. 6 is a flow chart indicative of sequential calculation of the reference point, control point, and angles of each part.

When a power supply (not shown) of the image display processor 1 is turned on and required manipulations are made on the processor 1, the data processor 5 starts to operate on the basis of the operation programs in the storage 3 and the CPU 50 thus realizes the respective elements 51–54. When an operation command SS is given to the data processor 5 by manipulating the operation unit 4, the motion selector 51 realized by the CPU 50 selects particular motion data from among predetermined motion data stored in the motion data memory 31 in accordance with the operation command (step S101).

The coordinate position determination unit 52 fetches data on the coordinates of the control and reference points S1 and T1 of the part U1 corresponding to the phase of a first one (FIG. 3(a)) of its series of movements of the selected motion on the basis of the selected motion data and determine the absolute coordinates of the points S1 and T1 (step S102).

In this phase, the angle calculation unit 53 calculates the angles of the bone B1 to the coordinate axes of the coordinate system of the reference point T1 on the basis of data on the coordinates of the control and reference points S1 and T1 (step S103). Data on the coordinates and the angles is then stored in the display matrix memory 36 and also in a stack matrix memory (not shown) (step S104). Thus, since data on the respective parts is sequentially calculated, stored in the display matrix memory 36 and saved in the stack matrix memory, all those operations are not mentioned each time they are performed, but those operations are typified by the mere description that such data is stored in the display matrix memory 36 in the following description.

The coordinate position determination unit 52 reads and fetches data on the reference point coordinates of the waist part U1 from the stack matrix memory (step S105) and calculates the absolute coordinates of the reference point T2 of the waist part U2 on the basis of the coordinates of the reference point T2 of the breast part U2 connected to the waist part U1 relative to the reference point T1 of the waist part U1 (step S106). That is, the coordinate positions of the reference point T1 and T2 of the parts U1 and U2 in the absolute coordinate system are determined.

In this phase, the angle calculation unit 53 calculates the angles of the bone D2 viewed from the reference point, that is, in the coordinate system of the reference point, on the basis of data on the coordinates of the control point S2 and the relative coordinates of the reference point T2 read from the control point memory 32 and the reference point memory 33, respectively (step S107). Data on those coordinates and angles is stored in the display matrix memory 36 of the RAM in the storage 3 (step S108). Thereafter, similar operations are performed for the respective remaining parts (steps S109–S128).

In order to express the image of an upper half of the character in steps S101–S120, the coordinates of the reference and control points of the respective parts and the angles of the respective bones of the character based on those coordinates are calculated and similar data is calculated to express a lower half of the character in steps S121–S128.

Thus, when this series of operations ends, data on angles of the bones of all the parts in the first phase of the predetermined motion (FIG. 3(a)) are obtained and stored in the display matrix memory 36 (FIG. 7). The parts are displayed on the display as the image phase of FIG. 3(a) on the basis of the data in the display matrix memory 36.

<Calculation of Angles at which a Part is Arranged>

Calculations of angles of a part (one B) in FIG. 6 (steps S103, S107, S111, S115, S119, S123 and S127) performed when the part is comprised of a single bone B (waist, breast or head) and when the part is comprised of two connected bones B (right and left arms, right and left legs) will be separately described below.

[When the Parts Comprised of a Single Bone]

Figure 9:
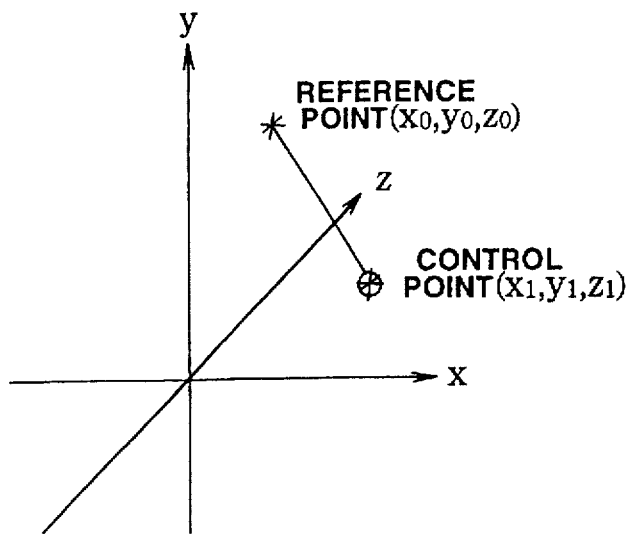
FIG. 9 illustrates the state of a part placed in a XYZ coordinate system in the embodiment.
Figure 10:
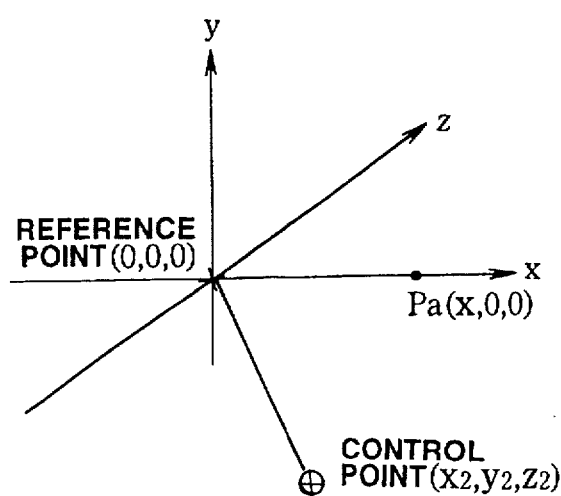
FIG. 10 illustrates the state of a reference point T of a part placed at the origin of a XYZ coordinate system in the embodiment.

FIG. B is a flow chart indicative of the determination of angles at which a part comprised of a single bone B is arranged. FIG. 9 schematically shows the presence of a reference point T and a control point S in the absolute coordinate system. FIG. 10 schematically illustrates the coordinates of the control point viewed from the reference point, i.e., the control point arranged in the coordinate system for the reference point.

As shown in FIG. 9, the absolute coordinates (x0, y0, z0) of the reference point T of a predetermined part U is generally not at the origin of the xyz orthogonal coordinate system, and data on the part U contains angle data on the reference point T. Thus, the angle calculation unit 53 calculates the coordinates of the control point S of the part U relative to the reference point on the basis of the absolute coordinates (x1, y1, z1) of the control point S.

The angle calculation unit 53 calculates an inverse matrix for a matrix which constitutes the coordinate system for the reference point T of the part U (step S201), multiplies the inverse matrix by the absolute coordinates (x1, y1, z1) of the control point S to obtain the relative coordinates (x2, y2, z2) of the control point in the coordinate system for the reference point (step S202). The matrix of the coordinate system for the reference point is characterized by the coordinate position of the reference point of the part U relative to the origin of the absolute coordinate system and the angles of the x, y, z axes of the coordinate system of the reference point relative to the x, y, z axes of the absolute coordinate system.

FIG. 10 shows that as the result of this calculation the reference point T of the part U coincides with the origin (0, 0, 0) of the xyz orthogonal coordinate system and that the control point S is at the coordinate point (x2, y2, z2). In such state, the angle calculation unit 53 assumes a point Pa (x, 0, 0) on the x axis expressed by the next equation Ex. 1.

Ex. 1:

$$x = \sqrt{(x2)^2 + (y2)^2 + (z2)^2}$$

The angle calculation unit 53 rotates the point Pa on the x axis around the respective z and y axes in the xyz orthogonal coordinate system so as to coincide with the coordinates (x2, y2, z2) of the control point S of the part U (step S203). By this operation, the angle determination unit 53 calculates the angles θz and θy of the bone B to the z and y axes, respectively, using the following Examples 2 and 3 (step S204):

Ex. 2:

$$\theta z = \arctan\left(\frac{y2}{x2}\right)$$

Ex. 3:

$$\theta y = \arctan\left(\frac{-z}{\sqrt{(x2)^2 + (y2)^2}}\right)$$

The reference point is the base end of the bone B to be displayed and the control point expresses an opposite end of the bone B. The angles express ones at which the bone is arranged with the reference point as the origin. By transforming the data stored in the bone data memory 34 from the coordinate system in the storage to the coordinate system of FIG. 10, allowing for the angles, the bone is easily arranged between the reference and control points.

Thus, only by storing data on the coordinates of the reference and control points T and S, its motion is expressed. That is, no data on the angles themselves of the part is required to be stored beforehand and the quantity of such data to be stored is reduced. By changing the position of the control point to a desired position as required, the angles of the bone at the reference point are set at desired values and a free motion of a joint of a character similar to the human body in the present embodiment is easily realized.

[When the Part is Comprised of Two Combined Bones]

Figure 11:
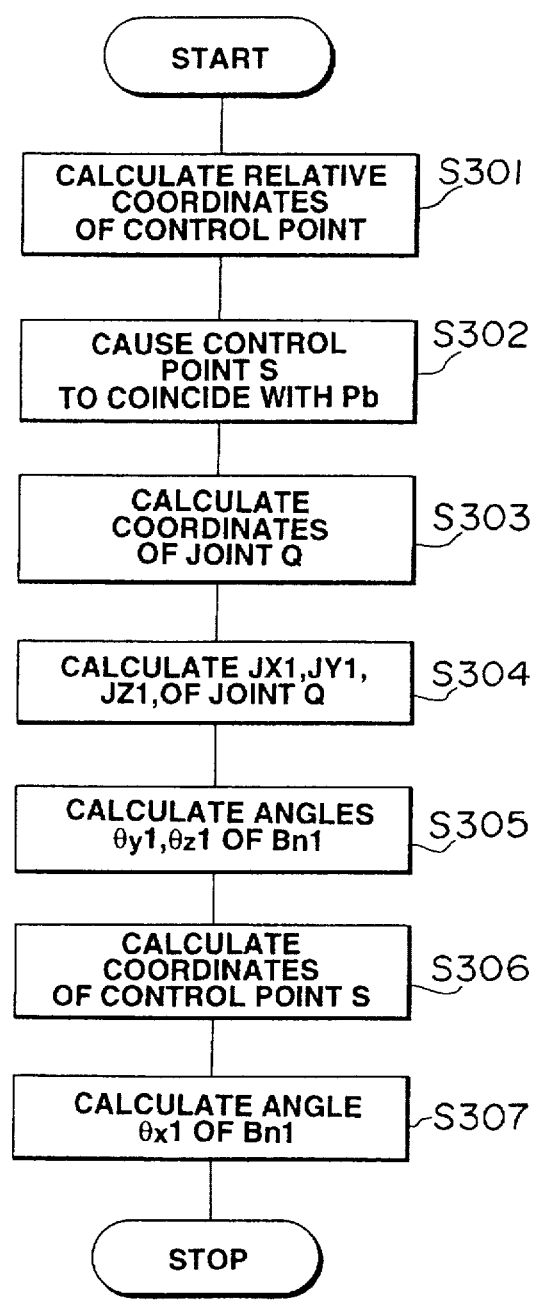
FIG. 11 is a flow chart indicative of the calculation of an angle of arrangement of a part comprised of a plurality of bones.
Figure 12:
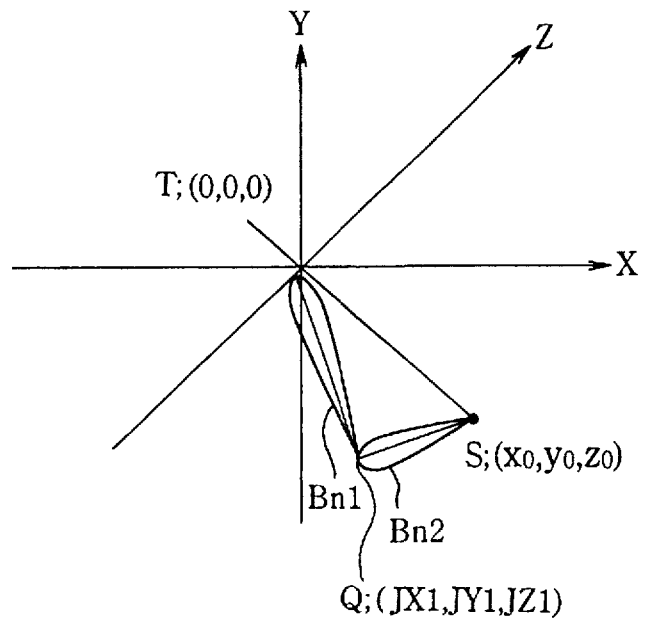
FIG. 12 illustrates a part whose reference point is placed at the origin of the XYZ coordinate system in the embodiment.
Figure 13:
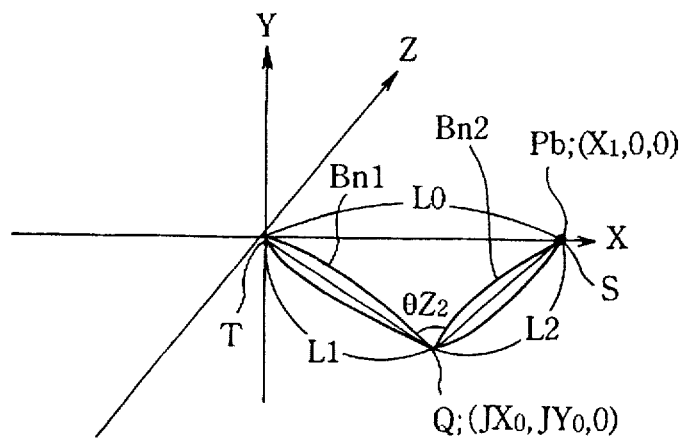
FIG. 13 illustrates a part comprised of two connected bones whose reference point is placed at the origin of the XYZ coordinate system and whose control point S is placed at a point on the X axis of the XYZ coordinate system in the embodiment.
Figure 14:
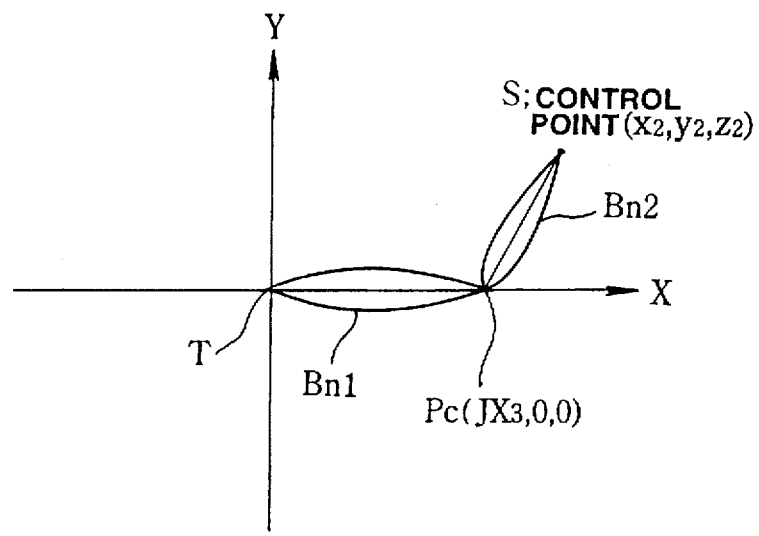
FIG. 14 illustrates the part comprised of connected bones whose reference point T is placed at the origin of the XYZ coordinate system and whose connection point Q is placed at a point on the X-axis in the embodiment.
Figure 15:
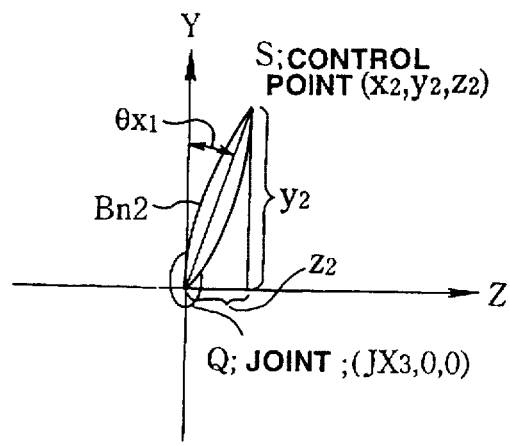
FIG. 15 shows a part viewed from a Y-Z plane of the XYZ coordinate system in the embodiment.

FIG. 11 is a flow chart indicative of the display of a part comprised of two combined bones. FIG. 12 shows a part U comprised of two connected bones Bn1 and Bn2 (as shown in FIG. 2, n is 4, 5, 6 and 7) whose reference point T has been arranged at the origin (0, 0, 0) of an orthogonal coordinate system. FIG. 13 shows the part U whose control point S has been moved to a point Pb (X1, 0, 0) on the X axis of the orthogonal coordinate system. FIG. 14 shows the connection point (or joint) Q of the two connected bones Bn1 and Bn2 arranged at a virtual point Pc (JX, 0, 0) in the orthogonal coordinate system. FIG. 15 shows the connection point Q of the two connected bones Bn1 and Bn2 viewed from the YZ plane of the orthogonal coordinate system. As described above, the part U having the two connected bones Bn1 and Bn2 includes right and left arms and right and left legs.

The angle calculation unit 53 starts desired calculations on the assumption that the reference point T of the part U is at the origin (0, 0, 0) of the coordinate system of the reference point. By calculating an inverse matrix for the matrix of the reference point T of the part U and multiplying the inverse matrix by the absolute coordinates of the control point S, the relative coordinates (x0, y0, z0) of the control point are calculated (step S301), which is similar to the cases of FIGS. 9 and 10 as mentioned above.

FIG. 12 shows that by such calculations the original absolute coordinates of the control point have been moved or transformed to its coordinates (x0, y0, z0) relative to the reference point of the part U. In such state, as shown in FIG. 13, the angle calculation unit 53 assumes a point Pb (X1, 0, 0) on the X axis. The angle calculation unit 53 then performs the operation of bringing the control point S of the part U to the point (X1, 0, 0) (step S302). That is, by rotating the coordinate system around the respective Z and Y axes in this order, using Examples 4 and 5 below, the control point S of the part U is moved to the point Pb on the X axis:

Ex. 4:

$$\theta z0 = \arctan\left(\frac{y0}{x0}\right)$$

Ex. 5:

$$\theta y0 = \arctan\left(\frac{-z0}{\sqrt{(x0)^2 + (y0)^2}}\right)$$

As shown in FIG. 13, let the lengths of the bones Bn1 and Bn2, and the distance between the origin point and the point Pb be L1, L2 and L0, respectively, and let the angle between the Bn1 and Bn2 be θz2. The coordinates of the joint Q and the angle θz2 between the bones Bn1 and Bn2 are then calculated, using cosine rule, as shown in Examples 6–8 below (step S303)

Ex. 6:

$$JX0 = \left(\frac{(L1)^2 + (L2+)^2 \cdot (L0)^2}{2L1}\right)$$

Ex. 7:

$$JY0 = \sqrt{(L_2)^2 - (JX0)^2}$$

Ex. 8:

$$\theta Z2 = \arccos\frac{(L1)^2 + (L2)^2 - (L0)^2}{2L1 \cdot L2}$$

Now, a process for returning data on the coordinates of the joint Q to its origin coordinates is performed. The joint Q is rotated by the angles θZ0 and θY0 calculated in Examples 2 and 3 around the respective Z and Y axes to thereby obtain the coordinates of the joint Q (JX1, JXY, JZ1), as shown in Example 9 (step S304):

Ex. 9:

$$JX1 = \cos\theta z0 \cdot \cos\theta y0 \cdot JX0 - \sin\theta z0 \cdot JY0$$
$$JY1 = \sin\theta z0 \cdot \cos\theta y0 \cdot JX0 + \cos\theta z0 \cdot JY0$$
$$JZ1 = -\sin\theta y0 \cdot JX0.$$

The angle calculation unit 53 calculates angles through which the point Pb (x1, 0, 0) on the X axis is rotated around the respective Z and Y axes so as to coincide with the joint Q (JX1, JY1, JZ1). In this case, the joint point Q is moved to the point Pc (JX3, 0, 0) on the X axis, as shown in FIG. 14, in which state the angle calculation unit 53 calculates the angles θY1, θZ1 of the bone Bn1 to the Y and Z axes, respectively, using Examples 10 and 11 (step S305):

Ex. 10:

$$\theta z1 = \arctan\left(\frac{JY1}{JX1}\right)$$

Ex. 11:

$$\theta Y1 = \arctan\left(\frac{-JZ1}{\sqrt{(JX1)^2 + (JY1)^2}}\right)$$

By rotating the control point S (x0, y0, z0) of the bone Bn1 by negative angles −θY1, −θZ1 opposite to the angles θY1, θZ1 calculated in step S305 around the respective Y and Z axes, data on the coordinates (x2, y2, z2) of the control point S is calculated, using the following expression 12 (step S306):

Ex. 12:

$$x2 = \cos\theta z1 \cdot \cos\theta y1 \cdot x0 - \cos\theta y1 \cdot \sin\theta z1 \cdot y0 + \sin\theta y1 \cdot z0$$
$$y2 = \sin\theta z1 \cdot x0 + \cos\theta z1 \cdot y0$$
$$z2 = -\cos\theta z1 \cdot \sin\theta y1 \cdot x0 + \sin\theta z1 \cdot \sin\theta y1 \cdot y0 + \cos\theta y1 \cdot z0.$$

The angle θX1 of the bone Bn1 is calculated, using the following Example 13 on the basis of data on the point calculated in step S306 (step S307):

Ex. 13:

$$\theta x1 = \arctan\left(\frac{z2}{y2}\right)$$

When the coordinates (x2, y2, z2) of the control point S transformed from its coordinates (x0, y0, z0) are viewed in the X-axis direction, the control point S is at a point deviating by the angle θX1 from the YZ plane, as shown in FIG. 15. By correcting the deviation of the angle θX1, the control point S is brought into the YZ plane. The angle θx1 is handled as the angle of the bone Bn1 to the X axis.

In this way, the angles of the bone Bn1 are expressed as θX1, θY1, θZ1 and the angle of the bone Bn2 is expressed as (π–θZ2). As just described above, the bone Bn1 has three angles while the bone Bn2 has only the angle to the Z axis.

When the part of the connected bones Bn1 and Bn2 becomes convex with their joint as a vertex in a direction opposite the direction mentioned earlier, it is required that (1) the signs of Example 7 be reversed, (2) π be subtracted from the angle θX1 of the bone Bn1 (that is, θX1–π), and (3) the symbol of the angle θZ2 of the bone Bn2 be reversed.

As described above, the angles of the bones Bn1 and Bn2 are calculated. Thus, by moving and arranging the bone B to and at the coordinates of the reference and control points T and S of the part U such that the bone B takes those angles to the appropriate axes, the bones Bn1 and Bn2 are defined at the appropriate positions.

According to this embodiment, even a complicated movement of the joint of parts comprised of two connected bones can be expressed simply and variously, using one reference point and one control point.

Thus, only data on the coordinates of the reference and control points T and S of a part U and data on the part comprised of connected bones are required to be stored and no data on all the rotatable angles around the respective X, Y and Z axes, of each motion of the part U involved in its respective movements is required to be stored. Thus, the amount of data to be stored is reduced greatly. In addition, the angles of the bones can be changed only by calculation, so that the degree of freedom of changing the angles is increased.

Figure 16:
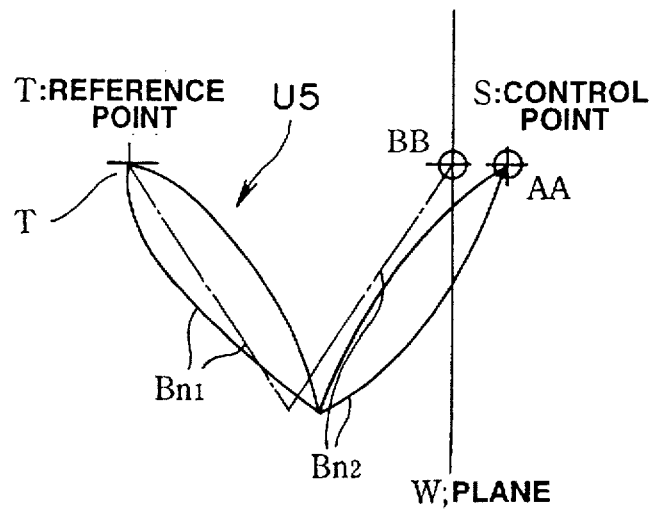
FIG. 16 illustrates the advantages of the embodiment.

As shown in FIG. 16, assume, for example, that the original coordinates of the control point S of a part U5 (right arm) are at point AA which is beyond a plane W, and the part is displayed as it is. In this case, the control point S would be displayed as if it were imbedded in the plane W. However, the CPU 50 realizes a control point position changing and setting unit (not shown) which changes and sets the position of the control point, so that the control point S is easily changed to a point BB on the plane W. In addition, even when the control point S is moved to the point BB, the angles of arrangement of the bone B are calculated easily with data on the control point S.

Thus, the control point S is easily changed and the degree of freedom of expression of the part U increases. The CPU 5 stores data on the changed position of the control point in the control point memory 32. Thus, the control point is not only given beforehand by the program but also set and changed as required depending on the manner of movement and display of a character (fighter).

Figure 17:
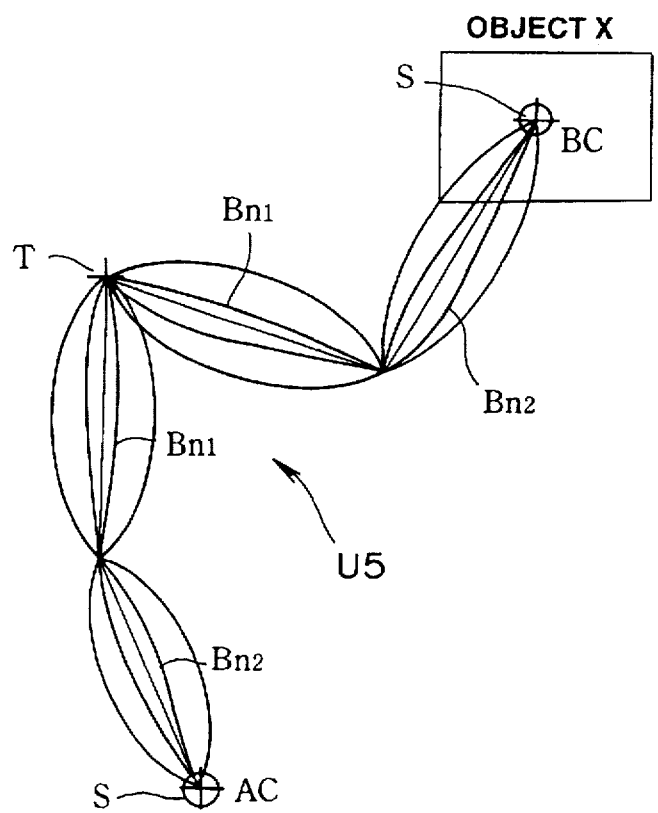
FIG. 17 illustrates other advantages of the embodiment.

As shown in FIG. 17, when the control point S of the part U5 is moved around its reference point T from a point AC to a point BC, which, for example, implies the operation of fetching data on a character X, the angles of arrangement of the bone B are calculated only by bringing the control point S from the point AC to the point BC, as described above, according to the present embodiment. Thus, the bone B is arranged accurately at a desired position to thereby increase the degree of freedom of expression of the part U5.

As described above, as a result, the whole character comprised of the respective parts U is three-dimensionally easily defined in the absolute coordinate system. The image output control unit 54 (FIG. 5) fetches data on the absolute coordinate system of the respective parts U from the display matrix memory 36 and comprises an image signal which defines the character C on the basis of the fetched data.

The image signal output unit 55 generates an image signal Vd which includes that image signal and other image data (for example, background image data) stored in the storage 3 and delivers the image signal Vd along with a display control signal to the display 2 to thereby display the whole image of the character in a first phase of the selected motion.

Thereafter, those operations are repeated on the basis of the data on the waist part U1 in a second phase of the selected motion to thereby display the whole image of the character in the second phase (FIG. 3(b)). By sequential repetitions of those operations, all the phases of the characters in corresponding scenes (moments) which constitute the series of movements of the selected motion are displayed (FIG. 3). When the processing for the phase (FIG. 3(m)) of the last character has ended, display of the selected motion ends.

Thus, by continuing such operations, the character is displayed in a form, for example, of FIG. 3(a) at a time t1; in a form, for example, of FIG. 3 (b) at a time t2, . . . and in a form, for example, of FIG. 3(m) at a time t13, so that the character appears to move continuously on the display 2.

In the process of FIG. 6, the auxiliary memory 35 of FIG. 4 is sequentially referred to and data on predetermined color E and material F of polygons defined as expressing the shape of each part is read so as to express the shape, color and material of that part.

As described above, in the present embodiment, the character C is described as being comprised, for example, of seven parts U1–U7 with a particular one of the parts (for example, waist part U1) being determined as a basic one. The motion position of the basic part U1 is determined on the basis of an operation command and data from motion data memory 31 selected by the motion selector 51 and put in the three-dimensional coordinate system of the display space. The arrangement of each bone B in the absolute coordinate system is calculated with the basic part U1 as a reference by referring to data in the control point memory 32, basic point memory 33 and bone data memory 34, and thus a corresponding character in the absolute coordinate system is constructed.

Thus, Since the arrangement of the bone B of a part U of the character C in the absolute coordinate system is easily calculated by determining data on the control point S of the part U, the degree of freedom of expression of the part U and the displayed state of the character required on the display 2 is easily obtained.

When an undesirable display state of the character appears on the display 2, the coordinates of the control point S are only required to be moved to a desirable position to easily calculate the position or arrangement of the bone B in the absolute coordinate system. Thus, as described above, the freedom of expression of the part U increases and the required quantity of data is reduced.

By storing data on the motion of the waist part in the motion data memory 31, the moving character can be displayed while reducing the processing time required for display of the image. The control point memory 32 stores data on the control point S of the part U in each of the motions and the control point S is changed easily.

Since the storage stores a plurality of motion data and predetermined motion data is selected in accordance with an operation command from the control unit, the moving character is displayed in a plurality of positions corresponding to the predetermined motion to thereby vary change the display of the moving character.

While in the embodiment the control point S of the part U is given in the absolute coordinates, it may be given either in coordinates relative to the position of the reference point T or in coordinates relative to a particular base end (for example, the reference point T1 of the waist part U).

While in the embodiment a plurality of polygons which constitutes the shape of a fighter as a character which includes an assembly of a plurality of parts has been illustrated as being subjected to modeling-transformation, a plurality of polygons may be arranged by handling the character itself as expressing the shape of the fighter. In the latter case, the bones themselves are handled as the shape of the fighter and a plurality of polygons which comprises each of the bones is defined.

<Second Embodiment>

A second embodiment of the image processor according to the present invention will be described next. In the first embodiment the angles of each part are calculated and a matrix depending on a motion is calculated. In contrast, in the second embodiment a matrix of each part depending on a motion is calculated directly.

Figure 18:
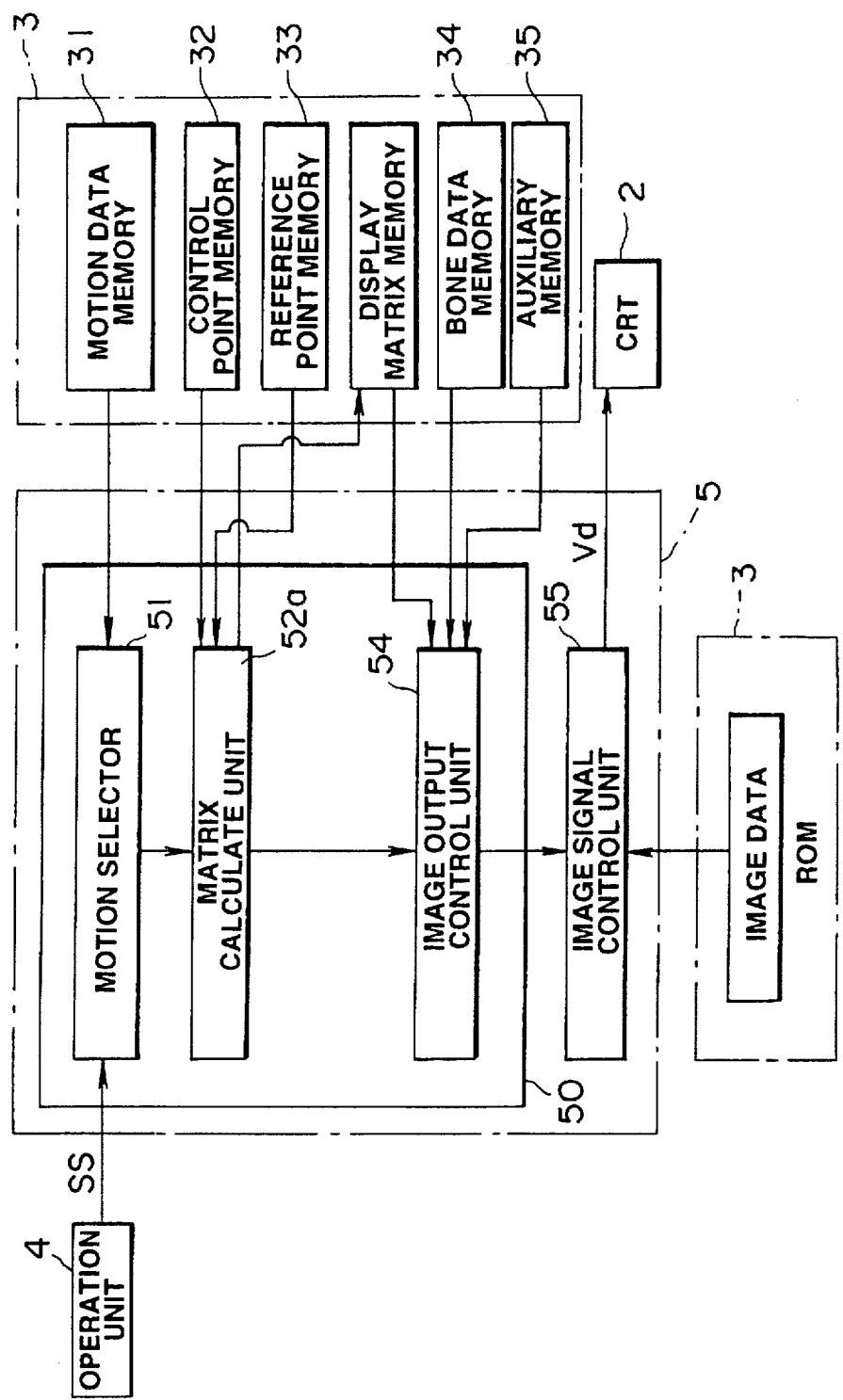
FIG. 18 is a functional block diagram of a second embodiment of the present invention.

The second embodiment of the image processor will be described with respect to FIG. 18 which is a functional block diagram thereof. In FIG. 18, CPU 50 executes a predetermined operation program stored in the storage 3 to realize a motion selector 51 which reads an operation command SS from the operation unit 4 and which selects a predetermined motions of a plurality of motions of the character C from the motion data memory 31 of the storage 3 in accordance with the operation command, more specifically, data (on the coordinates, etc.) on the reference points of the part U1 in the selected motion as in the first embodiment.

The output of the motion selector 51 is delivered to a matrix calculation 52a, which reads data on matrixes Mt for the respective reference and control points of the parts U1–U7 at predetermined moments (any of FIGS. 3(a)–(m)) in the selected motion from the memories 32, 33, and determines a matrix ML used to move into and display the part in the display coordinate system of the display on the basis of that read data. The matrix calculation unit 52a stores data on the matrix ML in the display matrix memory 36 and also in the stack matrix memory (not shown). The matrix calculation unit 52a successively calculates the respective matrixes M of the bone B in any of the respective phases of the selected motion.

The image output control unit 54 performs a moving and displaying process for the respective parts and hence the character comprised of those parts, namely, sequential display of the contents of the matrix memory 36 on the CRT on the basis of the matrixes obtained in the matrix calculation unit 52a. In other words, it fetches data on the appropriate part from the data memory 34 and arranges the corresponding part at the calculated angles at the reference point.

The data processor 5 further includes an image signal output unit 55, which forms a display signal Vd on the basis of data on the character from the image output control unit 54 of the CPU 50, the image signal from the CPU 50 and image data stored in the RAM of the storage 3, and delivers the display signal to the display 2.

<Creation of the Character>

Figure 19:
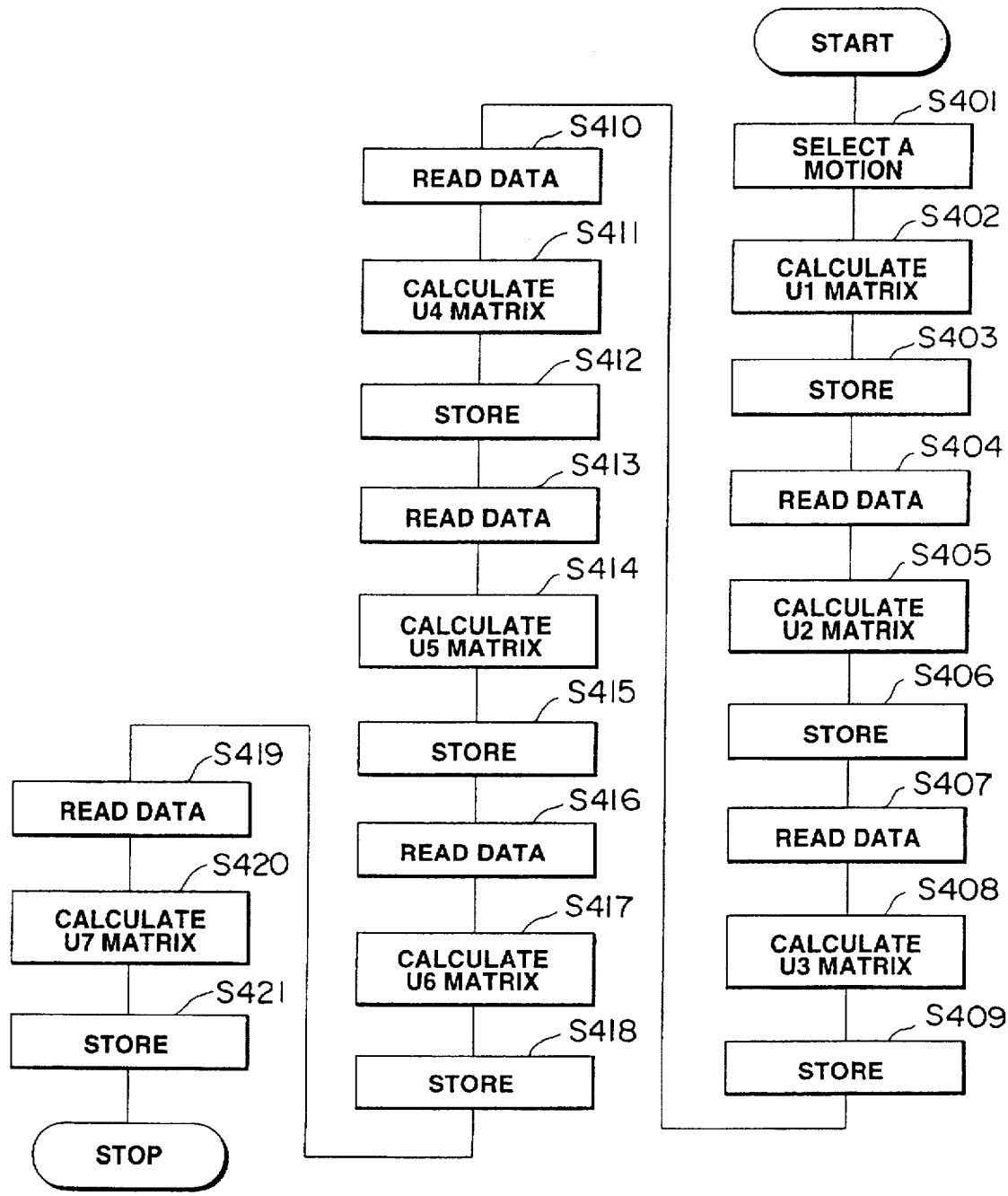
FIG. 19 is a flow chart indicative of the operation of the second embodiment.

FIG. 19 is a flow chart indicative of a sequential operation of a matrix for each part. When the image processor 1 is operated by required manipulations, the data processor 5 starts to operate in accordance with the operation program in the storage 3 and CPU 50 operates to realize the respective elements 51, 52, 53a and 54.

When the operation unit 4 is operated to issue an operation command to the data processor 5, the motion selector 51 realized by the CPU 50 selects particular motion data from among predetermined motion data stored in the motion data memory 31 of the storage 3 in accordance with the operation command (step 401).

The matrix calculation unit 52a fetches the matrix Mt1 having data on the control and reference points S1 and T1 corresponding to a first phase ((a) of FIG. 3) of a series of movements of the part U1 and determines the reference position on the display, and a matrix ML1 at the reference position of the bone B1 on the basis of the matrix Mt1 with data on the coordinates of the control and reference points S1 and T1 (step S402). Data on the matrix Mt1 is then stored in the display matrix memory 36 of the storage 3 and also in the stack matrix memory (not shown)(step S403).

Thus, since data on the respective parts is sequentially operated, stored in the display matrix memory 36 and saved in the stack matrix memory, all those operations are not mentioned each time they are respectively performed, but those operations are typified by the mere description that such data is stored in the display matrix memory 36 in the following description.

The matrix calculation unit 52a reads the stack matrix memory and fetches data on the reference point coordinates of the waist part U1 from the stack matrix memory (step S404) and calculates a matrix ML of a breast part U2 on the basis of data on the coordinates of the reference point T2 of the waist part U2 connected to the waist part U1 relative to its reference point T1 (step S405). That is, the coordinate positions of the reference positions T1 and T2 of the parts U1 and U2 in the absolute coordinate system are determined. Data on the matrixes ML of the parts U1 and U2 is stored in the display matrix memory of the RAM of the storage 3 (step S406). Thereafter, similar processing is executed for the remaining parts (steps S407–S421).

In order to display the image of an upper half of the character in steps S401–S415, the matrix ML for display of the bone B is calculated on the basis of the matrixes Mt of the coordinates of the reference and control points of each part, and similar data is processed to display a lower half of the character in steps S416–S421.

Thus, when this series of operations ends, data on the matrixes ML of all the parts in the first phase (FIG. 3(a)) of the predetermined motion and data on those matrixes is calculated and stored in the display matrix memory 36. The image out control (arrangement) unit 54 reproduces the data in the display matrix memory on the display 2 to display the image phase of FIG. 3(a).

<Calculation of Matrix ML in which a Part is Arranged>

Calculation of the matrix ML of the part (or bone) of FIG. 19 (steps S402, S405, S408, S411, S414, S417 and S420)

performed when the part is comprised of a single bone B (waist, breast or head) and when the part is comprised of two connected bones B (right and left arms, right and left legs) will be separately described below.

[When the Part is comprised of a Single Bone]

Figure 20:
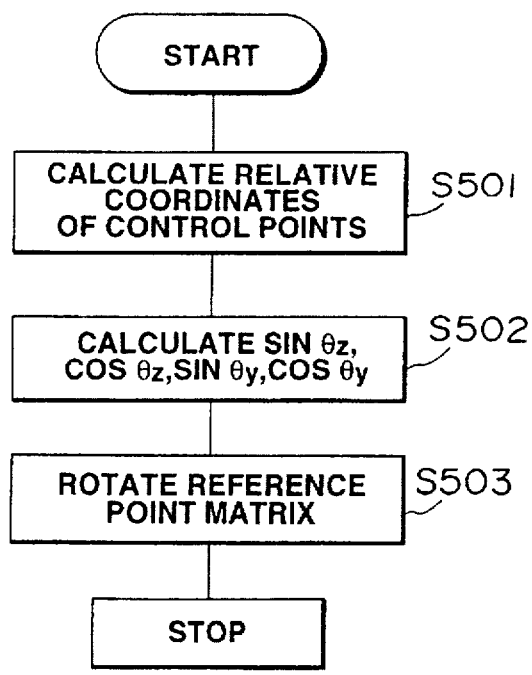
FIG. 20 is a flow chart indicative of the calculation of a matrix for a single bone in the second embodiment.
Figure 21:
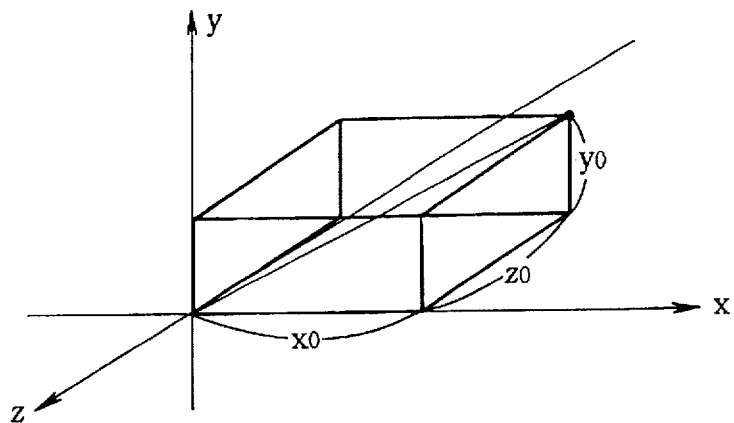
FIG. 21 is an illustration used for calculation of the matrix of FIG. 20.
Figure 22:
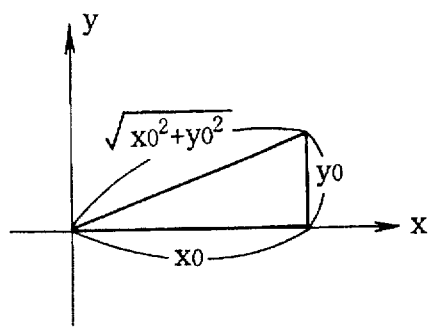
FIG. 22 is another illustration used for calculation of the matrix of FIG. 20.
Figure 23:
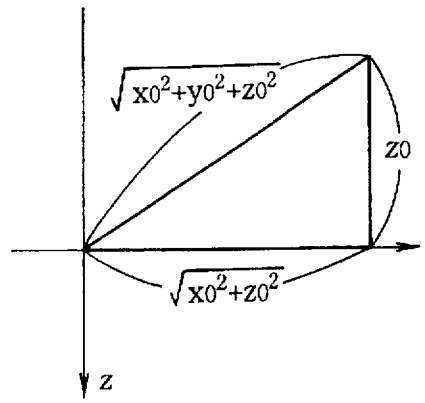
FIG. 23 is still another illustration used for calculation of the matrix of FIG. 20.

FIGS. 20–23 illustrate determination of a matrix M in which a part comprised of a single bone B is arranged. FIG. 20 is a flow chart indicative of calculation of the matrix M. FIG. 21 schematically shows the presence of a reference point T and a control point S in a relative coordinate system. FIG. 22 shows FIG. 21 viewed in the Z-axis direction. FIG. 23 illustrates a plane obtained by inclining the XY plane of FIG. 21 by an angle of θZ and viewed in the Y-axis direction.

The second embodiment uses the fact that rotation of a matrix M1 in order of −x, −y, −z and −z brings about a transposed matrix for a matrix M2 obtained by rotation of the matrix M1 in order of z, y, and x. More particularly, when a matrix M1 is rotated by multiplying the matrix M1 by a rotation matrix whose elements are Rx, Ry and Rz, rotation of the matrix M1 in a negative direction around the respective x, y, and Y axes in this order of a xyz orthogonal coordinate system bring about a transposed matrix for a matrix M2 obtained by rotations of the matrix M1 in a positive direction around respective z, y, and x axes in this order to obtain the relative coordinates of a part to thereby obtain its angles to the respective z, y, and z axes. A matrix calculation is performed on the basis of those angles to calculate a matrix M of the part arranged on the absolute coordinate system.

In other words in the second embodiment, the relative coordinates of a part are calculated, using the fact that a first matrix obtained by the rotation of a second matrix which includes multiplication of the second matrix by elements Rx, Ry and Rz of a rotation matrix in a negative direction around the respective x, y and z axes in this order becomes a transposed matrix of a third matrix which is obtained by the rotation of the second matrix which includes multiplication of the second matrix by elements Rx, gy and Rz of the rotation matrix in a negative direction around the respective z, y and x axes in this order. Thus, the angles of the part for the z and y axes and a matrix is calculated with those angles to obtain a matrix M of the part arranged in the absolute coordinate system.

As shown in FIG. 9, a predetermined part U is expressed by a matrix Ms involving the absolute coordinates (x0, y0, z0) and (x1, y1, z1) of the reference and control points P and S, respectively. The absolute coordinates (x0, y0, z0) of the reference point T is generally not at the origin of the xyz orthogonal coordinate system.

The relative coordinates of the control point of the part U are then calculated (step S501). First, let M be the product of a rotation matrix R (Rx, Ry, Rz) for the xyz coordinate system and a movement matrix T, and let $M^{-1}$ be an inverse matrix of the matrix M. Thus, the synthesis matrix $M^{-1} \cdot M$:

$$M^{-1} \cdot M = (T^{-1} \cdot Rz^{-1} \cdot Ry^{-1} \cdot Rx^{-1}) \cdot (Rx \cdot Ry \cdot Rz \cdot T) = E \quad \text{Ex14}$$

clarifies the following properties:

The inverse matrix of the rotation matrix R can be handled, using angles with inverted signs. The inverse matrix of the movement matrix T can be handled, using coordinates with inverted signs.

A matrix obtained by the product of the elements Rz, Ry, Rx of the rotation matrix R and the matrix M becomes:

Ex. 15:

$$\begin{pmatrix} Cy \cdot Cz & Cy \cdot Sz & -Sy \\ -Cx \cdot Sz + Sx \cdot Sy \cdot Sz & Cx \cdot Cz + Sx \cdot Sy \cdot Sz & Sx \cdot Cy \\ Sx \cdot Sz + Cx \cdot Sy \cdot Cz & -Sx \cdot Cz + Cx \cdot Sy \cdot Sz & Cx \cdot Cy \end{pmatrix} = $$

$$\begin{pmatrix} m00 & m01 & m02 \\ m10 & m11 & m12 \\ m20 & m21 & m22 \end{pmatrix}$$

where Cx=cosθx, Sx=sinθx, Cy=cosθy, Sy=sinθy, Cz=cosθz and Sz=sinθz.

Similarly, the matrix M rotated by multiplying the matrix M by elements Rx, Ry and Rz of the rotation matrix R in order of x, y and z in the negative direction is given as Ex. 16:

$$\begin{pmatrix} Cy \cdot Cz & -Cx \cdot Sz + Sx \cdot Sy \cdot Sz & Sx \cdot Sz + Cx \cdot Sy \cdot Cz \\ Cy \cdot Sz & Cx \cdot Cz + Sx \cdot Sy \cdot Sz & -Sx \cdot Cz + Cx \cdot Sy \cdot Sz \\ Sy & -Sx \cdot Cy & Cx \cdot Cy \end{pmatrix} = $$

$$\begin{pmatrix} r00 & r01 & r02 \\ r10 & r11 & r12 \\ r20 & r21 & r22 \end{pmatrix}$$

From Examples 15 and 16, we obtain

Ex. 17:

$$r00 = m00, r01 = m10, r02 = m20$$
$$r10 = m01, r11 = m11, r12 = m21$$
$$r20 = m02, r21 = m12, r22 = m22$$

This expression expresses that $Rz^{-1} \cdot Ry^{-1} \cdot Rx^{-1} = t$ (Rx, Ry, Rz). That is, rotation of the matrix M based on multiplication of the matrix M by elements Rx, Ry and Rz of the rotation matrix R in order of −x, −y and −z brings about a transposed matrix for a matrix obtained by rotation of the matrix M based on multiplication of the matrix M by elements Rz, Ry and Rx of the rotation matrix R in order of z, y and x.

Thus, in order to change absolute coordinates G (gx, gy, gz) of the control point S to its relative coordinates L (x0, y0, z0), the current matrix (corresponding to the reference point T) is required to be changed to:

Ex. 18

$$\begin{pmatrix} m00 & m01 & m02 & 0 \\ m10 & m11 & m12 & 0 \\ m20 & m21 & m22 & 0 \\ m30 & m31 & m32 & 1 \end{pmatrix}$$

By subtracting the movement elements (m30, m31, m32) from the absolute coordinates (gx, gy, gz) when the current matrix is Ex. 18, i.e., by putting x=gx−m30, y=gy−m31 and z=gz−m32, the current matrix (the reference point T) can be assumed to be at the origin, so that the reference point T can be put at the origin, as shown in FIG. 21.

In such state, the relative coordinates L(x0, y0, z0) of the control point S are calculated (step S501) as Ex. 19:

$$x0 = m00 \cdot x + m01 \cdot y + m02 \cdot z$$

-continued
$$y0 = m10 \cdot x + m11 \cdot y + m12 \cdot z \text{ and}$$
$$z0 = m20 \cdot x + m21 \cdot y + m22 \cdot z.$$

The above calculations in this second embodiment are substantially similar in amount to those performed in a regular coordinate movement. If calculation includes obtaining the inverse matrix and then the relative coordinates as in the first embodiment, the number of calculations of the inverse matrix is approximately six times that of the calculations of the coordinate movement, and calculations of the coordinate movement is further required. Therefore, the total number of calculations required in the first embodiment is approximately seven times that required for calculation of the coordinate movement. In contrast, the number of calculations required in the second embodiment is reduced to one seventh of that required in the first embodiment.

Sin $\theta z$, cos $\theta z$, sin $\theta y$ and cos $\theta y$ are easily calculated from the relative coordinates, thus calculated. The matrix calculation unit 52a first calculates sin $\theta z$ and cos $\theta z$ from Ex. 20 (step S502). When a figure of FIG. 21 is viewed in the z-axis direction, the figure appears having an oblique side of $(x0^2+y0^2)^{1/2}$, an x-axis component of x0 and a y-axis component of y0, as shown in FIG. 22. Thus, sin $\theta z$ and cos $\theta z$ are easily calculated as:

Ex. 20:
$$\begin{cases} \sin\theta_z = y0/(x0^2+y0^2)^{1/2} \\ \cos\theta_z = x0/(x0^2+y0^2)^{1/2} \end{cases}$$

Similarly, the matrix calculation unit 52a calculates sin $\theta y$ and cos $\theta y$ from Ex. 20 (step S502). When a plane obtained by inclining an xz-plane of FIG. 21 by an angle of $\theta z$ is viewed in the y direction, the figure appears having an oblique side of $(x0^2+y0^2+z0^2)^{1/2}$, an z-axis component of z0 and an axis component of $(x0^2+y0^2)^{1/2}$ perpendicular to the z axis, as shown in FIG. 23, so that sin $\theta z$ and cos $\theta z$ are easily calculated as:

Ex. 21:
$$\begin{cases} \sin\theta_y = -z0/(x0^2+y0^2+z0^2)^{1/2} \\ \cos\theta_y = (x0^2+y0^2)^{1/2}/(x0^2+y0^2+z0^2)^{1/2} \end{cases}$$

By using sin $\theta z$, cos $\theta z$, sin $\theta y$ and cos $\theta y$, thus obtained, the matrix calculation unit 52a rotates the matrix Mc for the reference point around the respective Z and Y axes in this order (step S503). Thus, the matrix Ms for the control point S is given as Ex. 22:
$$Ry \cdot Rz \cdot Mc = \begin{pmatrix} \cos\theta y & 0 & -\sin\theta y & 0 \\ 0 & 1 & 0 & 0 \\ \sin\theta y & 0 & -\cos\theta y & 0 \end{pmatrix} \cdot$$
$$\begin{pmatrix} \cos\theta z & \sin\theta z & 0 & 0 \\ -\sin\theta z & \cos\theta z & 0 & 0 \\ 0 & 0 & 1 & 0 \end{pmatrix} \cdot Mc = ML$$

While the matrix Ms of the control point S is normally rotated by a given angle $\theta$, it is eventually calculated on the basis of sin $\theta$ and cos $\theta$ calculated. Thus, the matrix Ms should directly be rotated on the basis of given sin $\theta$ and cos $\theta$.

Thus, rotation of the matrix Mc of the reference point around the respective z and y axes in this order brings about the matrix Ms of the control point S, as shown in Ex. 22, which may be handled as the matrix M of the bone.

Now, we take another view. Let Mt, Ms, Mb, Rz, Ry, T, and L be the reference point matrix, control point matrix, bone B matrix, z-axis rotation matrix, y-axis rotation matrix, coordinate movement (or transformation) matrix and the length of the bone B, respectively. In this case, the relationship between the matrix Mb, Mt, and Ms is given by Ex. 23:
$$Mb = Ry \cdot Rz \cdot Mt$$
$$Ms = T \cdot Mb = (L,0,0,1) \cdot Mb.$$

The latter expression indicates that the movement of the matrix Mb of the bone B by the length L of the bone from its reference point creates the matrix Ms of the control point S because the bone B extends in the x-axis direction. The matrix Mt of the reference point T is given by Ex. 24:
$$Mt = \begin{pmatrix} mt00 & mt01 & mt02 & 0 \\ mt10 & mt11 & mt12 & 0 \\ mt20 & mt21 & mt22 & 0 \\ xt & yt & zt & 1 \end{pmatrix}$$

Thus, the matrix Ms of the control point S of the bone B is given as $$Ms = T \cdot Mb = T \cdot Ry \cdot Rz \cdot Mt. \qquad \text{Ex. 25:}$$

When the matrix Mt of the reference point T is moved and rotated, the coordinates of the control point S (xs, ys, zs) are given by Ex. 26:
$$\begin{cases} xs = l(\cos\theta y \cdot \cos\theta z \cdot mt00 + \cos\theta y \cdot \sin\theta z \cdot mt10 - \sin\theta y \cdot mt20) + xt \\ ys = l(\cos\theta y \cdot \cos\theta z \cdot mt01 + \cos\theta y \cdot \sin\theta z \cdot mt11 - \sin\theta y \cdot mt21) + yt \\ zs = l(\cos\theta y \cdot \cos\theta z \cdot mt02 + \cos\theta y \cdot \sin\theta z \cdot mt12 - \sin\theta y \cdot mt22) + zt \end{cases}$$

In summary, in the present embodiment, when the part is comprised of a single bone, the relative coordinates of the control point S relative to the reference point T are calculated to obtain sin $\theta z$, cos $\theta z$, sin $\theta y$ and cos $\theta y$ and then the coordinates of the control point S relative to the reference point T is calculated, using the values of the sine and cosine to thereby obtain the calculation of the matrix M of the bone B.

[When a Part is Comprised of Two Bones]

Figure 24:
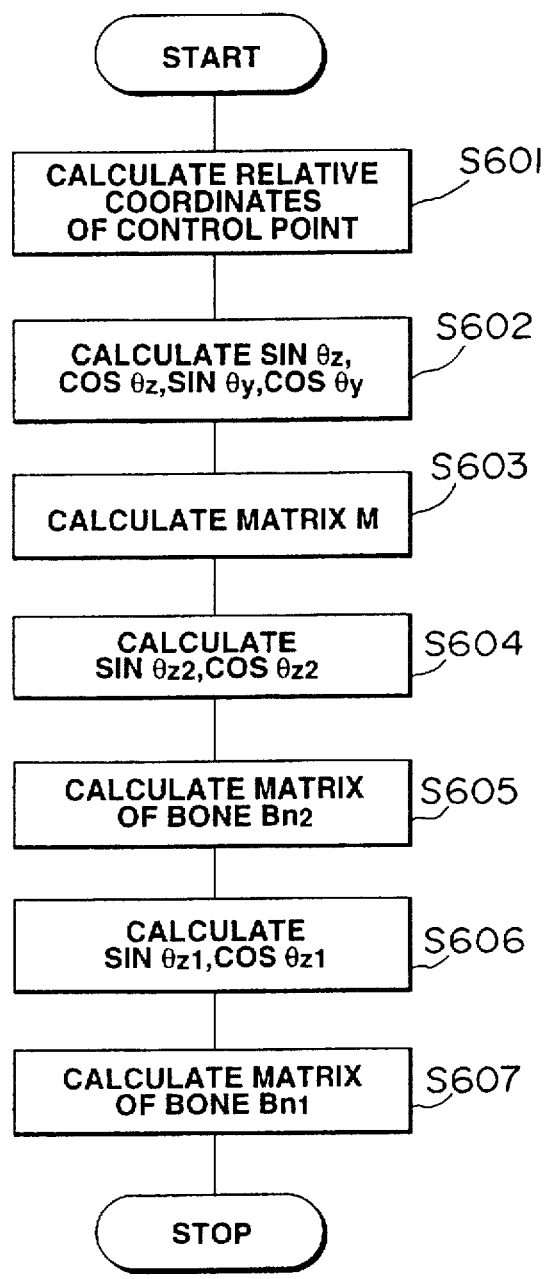
FIG. 24 is a flow chart indicative of the calculation of a matrix for a part comprised of two connected bones in the second embodiment.
Figure 25:
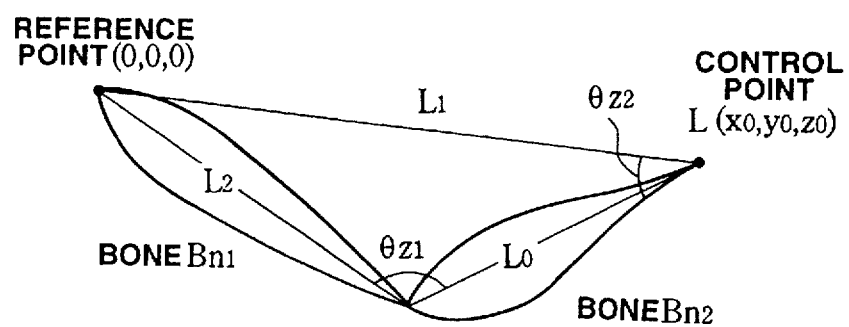
FIG. 25 shows an illustration used for calculation of a matrix for the part comprised of two connected bones in the second embodiment.

FIG. 24 is a flow chart indicative of the display of a part comprised of two connected bones. FIG. 25 shows the part comprised of two connected bones Bn1 and Bn2 (as in FIG. 2, n is 4, 5, 6 or 7) with its reference point T being at the origin (0, 0, 0) of the orthogonal coordinate system.

The matrix calculation unit 52a first calculates the relative coordinates of the control point S of the part U, using exactly the same method as that used when the part U is comprised of a single bone, as shown in FIGS. 9, 21–23 (step S601). This causes the reference point T of the part U to be arranged at the origin (0, 0, 0) of the orthogonal coordinate system (FIG. 25).

In FIG. 25, $L1=(x0^2+y0^2+z0^2)^{1/2}$ where L1, L0, and L(x0,y0,z0) be the length of the bone Bn1 (or the distance between the reference and control points T and S), the length of the bone Bn2, and the coordinates of the control point S, respectively.

Sin θz, cos θz, sin θy and cos θy are then calculated for L1 (step S602). These calculations may be performed in exactly the same manner as those performed when the part is comprised of a single bone. The matrix calculation unit 52a calculates sin θz and cos θz, using Ex. 20 and calculates sin θy and cos θy, using Example 21.

The matrix calculation unit 52a uses sin θz and cos θz, sin θy and cos θy, thus obtained, to perform a matrix operation to thereby obtain a matrix M having a length of L1 (or the matrix Ms of the control point S (step S603).

The matrix Mb2 of the bone Bn2 corresponds to a matrix obtained by rotation of the matrix Ms of the control point S through θz2 around the z axis. Thus, the matrix of the bone Bn2 is calculated next.

In FIG. 25, let θz2 and θz1 be the angle between the line segments L1 and L0 and the angle between the bones Bn1 and Bn2, respectively. Thus, the matrix calculation unit 52a calculates cos θz, using cosine rule in Ex. 27:

$$\cos\theta Z2 = \frac{L0^2 + L1^2 - L2^2}{2L0L1}$$

From formula $\sin^2\theta+\cos^2\theta=1$, $\sin\theta=\pm(1-\cos^2\theta)^{1/2}$. Thus, the matrix calculation unit 52a calculates cos θz2 and then sin θz2 from the above formula (step S604). When the bone Bn2 bends in the positive direction, $\sin\theta z2=+(1-\cos^2\theta z2)^{1/2}$ while when the bone Bn2 bends in the opposite direction, $\sin z2=-(1-\cos^2\theta z2)^{1/2}$ (step S604).

The matrix calculation unit 52a uses sin θz2 and cos θz2, thus calculated, to perform a calculation involving rotation of the matrix Ms of the control point S by an angle θz2 about the z axis, using the following Example 28 (step 605):

Ex. 28:

$$RZ2 \cdot ML = \begin{pmatrix} \cos\theta Z2 & \sin\theta Z2 & 0 & 0 \\ -\theta Z2 & \cos\theta Z2 & 0 & 0 \\ 0 & 0 & 1 & 0 \\ 0 & 0 & 0 & 1 \end{pmatrix} \cdot ML$$

By this calculation, the matrix of the bone Bn2 is directly obtained without calculation of the angles performed in the first embodiment.

The matrix of M of the bone Bn1 is then calculated. By applying cosine rule, cos θz1 is given on the basis of the relationship of FIG. 25 by Ex. 29:

$$\cos\theta Z1 = \frac{L0^2 + L2^2 - L1^2}{2L0L2}$$

From formula $\sin^2\theta+\cos^2\theta=1$, $\sin\theta=\pm(1-\cos^2\theta)^{1/2}$. Thus, the matrix calculation unit 52a calculates cos θz1 and then sin θz1 from the above formula (step S606). When the bone Bn1 bends in the positive direction, $\sin\theta z1=-(1-\cos^2\theta z1)^{1/2}$ and when the bone Bn1 bends in the opposite direction, $\sin z1=+(1-\cos^2\theta z1)^{1/2}$.

The matrix calculation unit 52a uses sin θz1 and cos θz1, thus obtained, to perform a calculation involving rotation of the matrix M of the bone Bn2 (a matrix Rz2·Ms of the joint of the bones Bn1 and Bn2) by an angle θz1 around the z axis, using the following Example 30 (step 607):

Ex. 30:

$$RZ1 \cdot RZ2 \cdot ML = RZ1 \cdot MB2 = \begin{pmatrix} \cos\theta Z1 & \sin\theta Z1 & 0 & 0 \\ -\sin\theta Z1 & \cos\theta Z1 & 0 & 0 \\ 0 & 0 & 1 & 0 \\ 0 & 0 & 0 & 1 \end{pmatrix} \cdot MB2$$

By this calculation, the matrix of the bone Bn1 is directly obtained without calculating the angles concerned as in the first embodiment.

[Advantages of the Second Embodiment]

In the second embodiment, a matrix for each bone is directly obtained when that bone is arranged at its reference position. The first embodiment performs the bone disposition matrix process in which (1) the inverse matrix is calculated, (2) the coincidence process is performed, (3) the angles concerned are calculated and (4) the matrix of the bone is obtained on the basis of the angles. In contrast, the second embodiment directly performs a bone disposition matrix process in which (1) the relative coordinates are obtained, (2) the values of the sine and cosine used for rotating purposes are calculated and (3) the predetermined rotations are performed to thereby directly calculate the matrix of the bones arranged, with one seventh of the number of calculations required in the first embodiment. Thus, the number of calculations required in the second embodiment is reduced compared to that required in the first embodiment.

Since the matrix for the predetermined coordinate system for the character is directly calculated on the basis of data on the coordinates of the reference point and control points of the character read from the reference and control point memories, respectively, in correspondence to the series of movements of the character, the calculation speed is increased and the character is arranged accurately.

In the second embodiment, the moving character is displayed substantially on the basis of the reference and control points to thereby reduce the quantity of data required for display of the moving character and to set the character at the desired position, thereby realizing various free movements of the character.

In the second embodiment, since the matrix calculation unit 52a calculates the relative coordinates of the control point relative to the reference point, using a transposed matrix for the matrix of the reference point, and calculates the values of the cosine and sine required to calculate the matrix on the basis of the relative coordinates, an accurate matrix is calculated and recalculation of the calculated matrix value can be performed easily and rapidly as required.

In the second embodiment, even when the character is comprised of a plurality of connected parts with the reference point being provided in a part including the base end of the character and with the control point being provided in a part including another end of the character, the matrix calculation unit 52a can performs a matrix operation on the matrix of the control point to obtain a matrix for the part at the joint concerned, and performs a matrix operation on the matrix of the joint of that part to obtain a matrix of another part concerned to thereby express the connected parts variously.

[Part 1]

A model of the character which has exhibited its motion can differ in shape from a second model which is desired to be displayed on the display screen. In this case, the coordinate components of the matrix are required to be re-calculated. For example, in FIG. 2 of the first embodiment, assume that the distance between reference points T1 and T3 of the bones B1 and B3 of the first-mentioned model is different from that between the reference points of the corresponding bones of the second model.

The matrix of the bone B2 can be said to be the same as that obtained by the method used in the second embodiment. If the distance between the reference points T1 and T3 of the first-mentioned model is longer than that between the reference points of the second model whose motion has been created, the matrix of the bone D3 of the former model does not coincide with the corresponding matrix calculated in the second embodiment, of course. In such a case, the coordinate components of the matrix of the bone Bn3 are required to be re-calculated.

Generally, the coordinate system in which the game is actually played does not coincide with the coordinate system in which the movement of a character has been exhibited. For example, when the movement of the character in the z direction has been created, the character is required to move in the xz plane in the actual game.

Thus, first, an angle component θy is required to be rotated around the Y axis and the resulting matrix is then required to be multiplied by the matrix of the character's movement. At this time, the matrix of the bone is required to be multiplied by the coordinate transformation of the angle θy on the right-hand side thereof.

While in the first embodiment the matrix is rotated by θy and the angles and coordinates of each part are sequentially calculated whereas in the second embodiment such re-calculation is replaced with processing the matrix itself to thereby reduce the number of calculations required compared to the first embodiment.

[Part 2]

In the second embodiment, a method of calculating an angle easily will be described when a matrix is given. By using Example 15, θy, θx and θz are calculated with the aid of an element of m, as is shown by Ex. 31:

$$\begin{cases} & m02 = -\sin\theta y \quad \theta y = a\sin(-m02) \\ \frac{m12}{m22} = \frac{\sin\theta x \cdot \cos\theta y}{\cos\theta x \cdot \cos\theta y} = \frac{\sin\theta x}{\cos\theta x} = \tan\theta x \quad \theta x = a\tan\left(\frac{m12}{m22}\right) \\ \frac{m01}{m00} = \frac{\cos\theta y \cdot \sin\theta z}{\cos\theta y \cdot \cos\theta z} = \frac{\sin\theta z}{\cos\theta z} = \tan\theta z \quad \theta 2 = a\tan\left(\frac{m01}{m00}\right) \end{cases}$$

In this case, θy, θx and θz are angles through which the matrix of the bone is rotated around the respective z, y and x axes. Similarly, the rotation angles can be also obtained irrespective of the order of rotation of the rotational axes. For example, the angles through which the matrix of the bone is rotated around the respective y, x and z axes can be obtained by referring to Example 15 and using Ex. 32:

$$\begin{bmatrix} Cz \cdot Cy + Sx \cdot Sy \cdot Sz & Sz \cdot Cx & -Cz \cdot Sy + Sx \cdot Cy \cdot Sz \\ -Sz \cdot Cy + Sx \cdot Sy \cdot Sz & Cz \cdot Cx & Sz \cdot Sy + Sx \cdot Cy \cdot Cz \\ Sy \cdot Cx & -Sx & Cx \cdot Cy \end{bmatrix} =$$

$$\begin{bmatrix} m00 & m01 & m11 \\ m10 & m11 & m12 \\ m20 & m21 & m22 \end{bmatrix}$$

By using the result of Example 32, θx, θy, and θz are calculated, as shown by:

Ex. 33:

$$\begin{cases} m21 = -Sx \quad \theta x = a\sin(-m21) \\ \frac{m20}{m22} = \frac{CxSy}{CxCy} = \tan\theta y \quad \theta y = a\tan\left(\frac{m20}{m22}\right) \\ \frac{m01}{m11} = \frac{SzCx}{CzCx} = \tan\theta z \quad \theta z = a\tan\left(\frac{m01}{m11}\right) \end{cases}$$

The above conclusion is effective for connection of the angles. For example, even if θx1, θy1, θz1 are simply subtracted from θx0, θy0, θz0, respectively, or vice versa, when the differences in angle between θx1, θy1, θz1 and θx0, θy0, θz0 are desired to be calculated, desired angle differences are not obtained because the order of rotation of the rotational axes is involved. In such a case, a matrix Mx for which the following Examples 34 and 35 hold is required to be calculated:

$$Mx \cdot Rx0 \cdot Ry0 \cdot Rz0 = Rx1 \cdot Ry1 \cdot Rz1 \qquad \text{Ex. 34:}$$

$$Mx = Rx1 \cdot Ry1 \cdot Rz1 \cdot Rz0^{-1} \cdot Ry0^{-1} \cdot Rx0^{-1} \qquad \text{Ex. 35:}$$

The right-hand side of Example 35 is equivalent to the rotation of Mx by −θx0, −θy0, −θz0, θx1, θy1 and θz1 in this order. By calculating the required angles on the basis of the components of the matrix Mx thus calculated, the differences in angle are obtained accurately. The conclusion thus obtained is applicable to a theory which connects adjacent motions smoothly.

As described above, according to the inventive image processing, since a character is displayed in the coordinates system area determined by the reference and control points, the moving character is displayed substantially on the basis of the reference and control points. The quantity of data required for display of the moving character is reduced compared to the conventional case. By setting the control point at a desired position, various free movements of the character are realized.

In correspondence to a series of movements of the character determined on the basis of a movement command, the angle calculation circuit calculates the angles of each character to a predetermined coordinate system on the basis of data on the coordinates of the reference and control points of the character read from the reference and control point memories. The character is arranged at the calculated angles, so that even when no angles indicative of the movement of the character are stored beforehand, the angles of the character are calculated and the character is arranged at those angles each time the character moves.

By calculating the angles as such to the coordinate system of the reference point, the character is arranged accurately at its reference point.

By storing data on the character for display beforehand in a predetermined coordinate system and arranging the character formed by data on the character in an area of the coordinate system, recording of data on the coordinates of the respective moving dots which constitute the character is omitted to thereby greatly reduce the quantity of data required for display of the movement of the character compared to the conventional case.

By multiplying the absolute coordinates of the control point by an inverse matrix for the matrix of the reference point, the relative coordinates of the control point to the reference point are calculated. By calculating the angles, mentioned above, on the basis of the reference coordinates, the angles of the control point to the coordinate system of the reference point are easily obtained to thereby increase the processing speed for display of the movement of the character.

By setting the reference point in the base end of the character and the control point in another end of the character, a movement of the character similar to that of a human body is realized while the aforementioned various advantages produced by the present invention are being achieved.

Even when a character is comprised of a plurality of connected parts, the movement of the character is displayed only by setting its reference and control points.

Since the matrix of the character for a predetermined coordinate system is directly calculated on the basis of data on the coordinates of the reference and control points of the character read from the reference and control point memories in correspondence to a series of movements of the character, the required number of calculations in the present invention is greatly reduced compared to that which would otherwise be required, and the calculation speed is increased and the character is arranged accurately.

Thus, display of the moving character is achieved substantially on the basis of those reference and control points, a quantity of data required for display of the movement of the character is reduced compared to the conventional case, the character is set at a desired position and various free movements of the character are realized.

The matrix calculation unit calculates the coordinates of the control point relative to the reference point, using a transposed matrix for the matrix of the reference point, and calculates the cosine and sine values for calculation of the matrix from the relative coordinates. Thus, an accurate matrix is calculated and recalculation of the calculated matrix value is achieved easily at high speed as required.

As described above, even when (1) a character is comprised of a plurality of connected parts (bones), (2) the reference point is provided in a part including the base end of the character, and (3) the control point is provided in a part including another end of the character, the matrix calculation circuit performs a matrix operation on the matrix of the control point to calculate a matrix of the part at its joint and performs a matrix operation on the matrix of the joint to obtain a matrix of another part. Thus, the character can be expressed variously.

In the present invention, determination of angles of a part of the character at the reference point is based on a corresponding bone having its length, so that calculation of the angles of the part is performed easily and rapidly.

The game devices described in the present invention are provided for business or home use. Software applied to the game devices is stored and sold commercially in CD-ROMS and ROM cassettes.

What is claimed is:

1. An image processor for displaying a predetermined figure while moving same, comprising:

a reference point memory for storing data corresponding to a plurality of reference points for displaying the figure, wherein each reference point is part of a sequence defining a series of movements of the figure;

a control point memory for storing data corresponding to a plurality of control points, wherein each control point defines a position relative to each reference point and wherein a figure part is disposed between a reference point and a control point;

a control unit for outputting a movement command for moving the figure, wherein said movement command changes the position of said control point in a manner constrained to provide the appearance of substantially fluid motion of said figure part; and an image display control unit for performing an image process to arrange the figure in an area of a coordinate system determined by the reference point and the control point in accordance with the movement command.

2. An image processor according to claim 1, further comprising an angle calculation unit for calculating an angle of the figure to a predetermined coordinate system on the basis of data on the coordinates of the reference and control points of the figure read from said reference and control point memories in correspondence to the series of movements of the figure determined on the basis of the movement command, and an arranging unit for arranging the figure at the calculated angle to the predetermined coordinate system.

3. An image processor according to claim 2, wherein said angle calculation unit calculates an angle of the figure involving the control and reference points to the coordinate system of the reference point, and said arranging unit arranges the figure from the reference point at the calculated angle to the coordinate system of the reference point.

4. An image processor according to claim 1, further comprising a memory for storing data on the figure beforehand in a predetermined coordinate system, and wherein said image display unit arranges a figure formed on the basis of data on the figure in the area of the coordinate system.

5. An image processor according to claim 2, wherein said angle calculation unit multiplies absolute coordinates of the control point by an inverse matrix for a matrix of the reference point to obtain relative coordinates of the control point to the reference point, and calculates the angle on the basis of the relative coordinates.

6. An image processor according to claim 2, wherein the figure is comprised of a plurality of connected parts with the reference point being provided in a part including a first end of the figure and with the control point being provided in a part including a second end of the figure, said image display unit comprises a joint calculation unit for calculating a joint where adjacent parts are connected, said angle calculation unit calculates a joint angle at which the adjacent parts are connected at the joint, and an angle between the reference point and the coordinates of the reference point, said arranging unit arranges the part having the reference point at the last-mentioned calculated angle from the first end of the figure and also arranges another part according to the joint angle relative to the part adjacent to the joint.

7. An image processor according to any one of claims 1-6, wherein the reference point is set in the base end of the figure and the control point is set in another end of the figure.

8. An image processor according to claim 1, wherein said image display control unit comprises a position control unit for changing and/or setting the control point to and/or at a desired position.

9. An image processor according to claim 8, wherein said position control unit changes the position of one of said reference points located inside said figure to another position located outside said figure.

10. An image processor according to claim 1, wherein said angle calculation unit calculates the angle on the basis of a bone having a length defined for the figure.

11. An image processor according to claim 3, wherein said image display unit comprises a matrix calculation unit for calculating a matrix of the figure for a predetermined coordinate system on the basis of data on the coordinates of the reference and control points of the figure read from said reference and control point memories in correspondence to the series of movements of the figure determined on the basis of the movement command, and a unit for arranging the figure to the calculated matrix.

12. An image processor according to claim 11, wherein said matrix calculation unit calculates a matrix of the control point to the coordinate system of the reference point, and said arranging unit arranges the figure on the basis of the calculated matrix.

13. An image processor according to claim 12, wherein said matrix calculation unit calculates the relative coordinates of the control point to the reference point, using a transposed matrix for the matrix of the reference point, and calculates the matrix on the basis of the relative coordinates.

14. An image processor according to claim 11, wherein the figure includes a character comprised of a plurality of connected parts with the reference point being provided in a part including a first end of the figure and with the control point being provided in a part including a second end of the figure, said matrix calculation unit performs a matrix operation on the matrix of the control point to obtain a matrix of a part at a joint where the last-mentioned part is connected to another part, and also performs a matrix operation on a matrix of the last mentioned joint to obtain a matrix of the another part at the joint, and said arranging unit arranges the character in a predetermined coordinate system on the basis of the matrixes of the respective parts.

15. An image processing method for displaying a predetermined figure while moving same, comprising the steps of:

setting data corresponding to a plurality of reference points for displaying the figure, wherein each reference point is part of a sequence defining a series of movements of the figure;

setting a control point which defines another position of the figure relative to the reference point, wherein a figure part is disposed between a reference point and said control point;

outputting a movement commend to the figure, wherein said movement command changes the position of said control point in a manner constrained to provide the appearance of substantially fluid motion of said figure part; and displaying the figure in an area of a coordinate system determined by the reference point and the control point in accordance with the movement command.

16. An image processor according to claim 9, wherein said another position is on the surface of said figure.

* * * * *

UNITED STATES PATENT AND TRADEMARK OFFICE
CERTIFICATE OF CORRECTION

PATENT NO. : 5,767,861
DATED : June 16, 1998
INVENTOR(S) : Shin KIMURA

It is certified that error appears in the above-identified patent and that said Letters Patent is hereby corrected as shown below:

Title Page, Item [54], in the Title, line 1, before "PROCESSING", insert -- IMAGE--.

Title Page, Item [57], in the Abstract, line 1, after "predetermined", insert --,--.

Title Page, Item [57], in the Abstract, line 4, after "figure", delete "in".

Title Page, Item [57], in the Abstract, line 5, after "includes", delete ",".

Title Page, Item [57], in the Abstract, line 6, "point" (second occurrence) should read --points--.

Title Page, Item [57], in the Abstract, line 9, after "includes", delete ",".

Claim 15, Col. 30, line 14, "commend" should read --command--.

Signed and Sealed this

Seventh Day of September, 1999

Attest:

Q. TODD DICKINSON

*Attesting Officer*    *Acting Commissioner of Patents and Trademarks*